United States Patent
Sexauer et al.

(10) Patent No.: US 12,554,665 B2
(45) Date of Patent: Feb. 17, 2026

(54) ELECTRONIC COMMUNICATION SYSTEM AND METHOD

(71) Applicant: BAE SYSTEMS Information and Electronic Systems Integration Inc., Nashua, NH (US)

(72) Inventors: Michael W. Sexauer, Nashua, NH (US); Robert E. Scholl, Morristown, NJ (US); George M. Horihan, Staten Island, NY (US); Bassem Scander, Monroe, NY (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 28 days.

(21) Appl. No.: 18/653,188

(22) Filed: May 2, 2024

(65) Prior Publication Data
US 2025/0342131 A1   Nov. 6, 2025

(51) Int. Cl.
*G06F 13/40* (2006.01)
(52) U.S. Cl.
CPC ............................ *G06F 13/4022* (2013.01)
(58) Field of Classification Search
CPC .................................................. G06F 13/4022
See application file for complete search history.

(56) References Cited

U.S. PATENT DOCUMENTS

| | | | |
|---|---|---|---|
| 2019/0386816 A1* | 12/2019 | Critelli | G06F 21/74 |
| 2023/0016892 A1* | 1/2023 | Grohoski | G11C 29/4401 |
| 2023/0244748 A1* | 8/2023 | Natarja | G06N 3/063 |
| 2024/0202046 A1* | 6/2024 | Misra | G06F 9/5077 |

OTHER PUBLICATIONS

XILINX "LogiCORE IP Aurora 8B/10B v5.3" [Retrieved on Jun. 18, 2024] retrieved from the internet [URL https://docs.amd.com/v/u/en-US/aurora_8b10b_ds637].
XILINX "AXI4-Stream Interconnect v1.1 LogiCORE IP Product Guide" [Retrieved on Jun. 18, 2024] retrieved from the internet [URL https://docs.xilinx.com/v/u/en-US/pg035_axis_interconnect].
Adaptive Soc & FPGA Support "The feasibility of Aurora for FPGAs data communication through cable." [retrieved on May 2, 2024] retrieved from the internet [URL: https://support.xilinx.com/s/question/0D52E00006hpTOcSAE/the-feasibility-of-aurora-for-fpgas-data-communication-through-cable?language=en_US].
AMD XILINX "AXI4-Stream Infrastructure IP Suite (PG085)" [retrieved on May 2, 2024] retrieved from the internet [URL https://docs.amd.com/r/en-US/pg085-axi4stream-infrastructure/AXI4-Stream-Switch?tocId=9Wro1XMQghpmuSe6z8RI1Q].

* cited by examiner

Primary Examiner — Henry Tsai
Assistant Examiner — Aurangzeb Hassan
(74) Attorney, Agent, or Firm — Maine Cernota & Curran; Gary McFaline

(57) ABSTRACT

An addressably switchable interconnecting device, comprising an AXI stream switch having a plurality of input/output ports, configured so as to receive, into a first input/output port, data and control signals as well as a switch destination output port signal, to connect the first input/output port to a second input/output port depending on the switch destination output port signal, so as to pass the data and control signals from the first input/output port through the stream switch to the second input/output port, and further comprising a switch destination output port signal generating device for generating the switch destination output port signal from the data signal. Also a communication system and a communication protocol using the addressably switchable interconnecting device.

17 Claims, 12 Drawing Sheets

FIG. 3

| Byte | Bit Field | | | |
|---|---|---|---|---|
| | \multicolumn{4}{c}{Routing Header Definition} | | | |
| 0 | Cmd Type (2B) | | Msg Type (2B) | |
| 4 | Reserved (1B) | Reserved (1B) | Reserved (1B) | Reserved (1B) |
| 8 | Reserved (1B) | Reserved (1B) | Reserved (1B) | Reserved (1B) |
| 12 | Src Interconnect ID (1B) | Src Port ID (1B) | Dst Interconnect ID (1B) | Dst Port ID (1B) |
| 16 | Reserved (1B) | Reserved (1B) | Reserved (1B) | Reserved (1B) |
| 18 | Reserved (1B) | Reserved (1B) | Reserved (1B) | Reserved (1B) |
| 20 | Reserved (1B) | Reserved (1B) | Reserved (1B) | Reserved (1B) |
| 24 | Reserved (1B) | Reserved (1B) | Reserved (1B) | Reserved (1B) |
| 28 | Reserved (1B) | Reserved (1B) | Reserved (1B) | Reserved (1B) |
| 32 | Reserved (1B) | Reserved (1B) | Reserved (1B) | Reserved (1B) |
| 36 | Reserved (1B) | Reserved (1B) | Reserved (1B) | Reserved (1B) |
| 40 | Reserved (1B) | Reserved (1B) | Reserved (1B) | Reserved (1B) |
| 44 | Reserved (1B) | Reserved (1B) | Reserved (1B) | Reserved (1B) |
| 48 | Reserved (1B) | Reserved (1B) | Reserved (1B) | Reserved (1B) |
| 52 | Reserved (1B) | Reserved (1B) | Reserved (1B) | Reserved (1B) |
| 56 | Reserved (1B) | Reserved (1B) | Reserved (1B) | Reserved (1B) |
| 60 | Payload Length (4B) | | | |

FIG. 4A

| Input (Hex) | | TDEST (Binary) | TVALID (Binary) |
|---|---|---|---|
| Dst Interconnect ID | Dst Port ID | | |
| 5A | 00 | 0000 | 1 |
| 5A | 01 | 0001 | 0 |
| 5A | 02 | 0010 | 1 |
| 5A | 03 | 0011 | 1 |
| 5A | 04 | 0100 | 1 |
| ... | ... | ... | ... |
| 5B | xx | 0001 | 1 |
| Anything else | | | 0 |

FIG. 4B

| Input (Hex) | | TDEST (Binary) | TVALID (Binary) |
|---|---|---|---|
| Dst Interconnect ID | Dst Port ID | | |
| 5A | xx | 0000 | 1 |
| 5B | 00 | 0000 | 0 |
| 5B | 01 | 0001 | 1 |
| 5B | 02 | 0010 | 1 |
| 5B | 03 | 0011 | 1 |
| ... | ... | ... | ... |
| Anything else | | | 0 |

FIG. 9

| Routing Header Definition | | | |
|---|---|---|---|
| Byte | Bit Field | | | |
| 0 | Cmd Type (2B) | | Msg Type (2B) | |
| 4 | Reserved (1B) | Reserved (1B) | Reserved (1B) | Reserved (1B) |
| 8 | Src Box ID (2B) | | Src Slot ID (2B) | |
| 12 | Src Interconnect ID (1B) | Src Port ID (1B) | Dst Box ID (2B) | |
| 16 | Dst Slot ID (2B) | | Dst Interconnect ID (1B) | Dst Port ID (1B) |
| 20 | Reserved (1B) | Reserved (1B) | Reserved (1B) | Reserved (1B) |
| 24 | Reserved (1B) | Reserved (1B) | Reserved (1B) | Reserved (1B) |
| 28 | Reserved (1B) | Reserved (1B) | Reserved (1B) | Reserved (1B) |
| 32 | Reserved (1B) | Reserved (1B) | Reserved (1B) | Reserved (1B) |
| 36 | Reserved (1B) | Reserved (1B) | Reserved (1B) | Reserved (1B) |
| 40 | Reserved (1B) | Reserved (1B) | Reserved (1B) | Reserved (1B) |
| 44 | Reserved (1B) | Reserved (1B) | Reserved (1B) | Reserved (1B) |
| 48 | Reserved (1B) | Reserved (1B) | Reserved (1B) | Reserved (1B) |
| 52 | Reserved (1B) | Reserved (1B) | Reserved (1B) | Reserved (1B) |
| 56 | Reserved (1B) | Reserved (1B) | Reserved (1B) | Reserved (1B) |
| 60 | Payload Length (4B) | | | |

FIG. 10

| Input (Hex) | | | | TDEST (Binary) | TVALID (Binary) |
|---|---|---|---|---|---|
| Dst Box ID | Dst Slot ID | Dst Interconnect ID | Dst Port ID | | |
| >05 | xx | xx | xx | 0000 | 1 |
| <05 | xx | xx | xx | 0101 | 1 |
| 05 | >00 | xx | xx | 0100 | 1 |
| 05 | 00 | >00 | xx | 0101 | 1 |
| 05 | 00 | 00 | 00 | 0000 | 0 |
| 05 | 00 | 00 | 01 | 0001 | 1 |
| 05 | 00 | 00 | 02 | 0010 | 1 |
| 05 | 00 | 00 | 03 | 0011 | 1 |
| 05 | 00 | 00 | 04 | 0100 | 1 |
| 05 | 00 | 00 | 05 | 0101 | 1 |

ELECTRONIC COMMUNICATION SYSTEM AND METHOD

STATEMENT OF GOVERNMENT INTEREST

The invention was made with United States Government support under contract number 19-F-2503, project code 19LPU, awarded by a classified agency. The United States Government has certain rights in this invention.

FIELD OF THE DISCLOSURE

The present disclosure relates to data communication methods and data communication systems in electronic systems, specifically addressable data communication methods and data communication systems that take advantage of the low overhead and low latency of highly efficient point-to-point communication protocols.

BACKGROUND

Efficient data communication is crucial in modern electronic systems. Protocols like AXI Stream and Aurora facilitate high-speed transfers within chips or between them. While traditional point-to-point protocols lack addressability, Ethernet offers flexibility but comes with processing overhead. A need exists for a lean communication system—efficient and addressable—for use within chips, between chips, and between cards, without the complexity and overhead of Ethernet.

SUMMARY

To addresses this challenge, one embodiment is an electronic communication system comprising: an addressably switchable interconnecting device, comprising a stream switch having a plurality of input/output ports; a switch destination output port signal generator configured to generate and output a switch destination output signal; a first input/output port, of said plurality of input/output ports, configured so as to receive a data signal, a control signal, and said switch destination output port signal; a second input/output port, of said plurality of input/output ports, connected to said first input/output port by a connection that is formed in accordance with the switch destination output port signal.

Another embodiment is an electronic communication system wherein the addressably switchable interconnecting device further comprises: a data first-in/first-out buffer for receiving, buffering, and outputting the data signal and the control signal to the first input/output port.

A further embodiment is an electronic communication system wherein the addressably switchable interconnecting device further comprises: a first single-beat buffer for receiving the data signal and the control signal from the data first-in/first-out buffer, buffering the data signal and the control signal, and outputting the data signal and the control signal to the first input/output port and to the switch destination output port signal generating device.

Still another embodiment is an electronic communication system wherein the addressably switchable interconnecting device further comprises: a second single-beat buffer for receiving the data signal and a control signal from the second input/output port, for buffering the data signal, and for outputting the data signal and the control signal.

A still further embodiment is an electronic communication system wherein the addressably switchable interconnecting device is configured so as to operate using an AXI streaming protocol, and wherein a control signal is an AXI streaming protocol control signal.

An even further embodiment is an electronic communication system wherein the switch destination output port signal generating device comprises a lookup table.

Even another embodiment is an electronic communication system wherein the switch destination output port signal generating device is configured so as to receive a routing header beat in the data signal and to apply the routing header beat to the lookup table to generate the switch destination output port signal.

An even further embodiment is an electronic communication system wherein the switch destination output port signal generating device is configured so that, after a switch destination output port signal is generated, that switch destination output port signal is maintained throughout a subsequent data stream until the switch destination output port signal is cleared by a control signal.

Yet another embodiment is an electronic communication system comprising: a plurality of said addressably switchable interconnecting devices; a first protocol converting device, connected through an interconnection to a port of a first addressably switchable interconnecting device, of said plurality of addressably switchable interconnecting devices, for converting between the AXI streaming protocol and a second streaming protocol; a second protocol converting device, connected through an interconnection to a port of a second addressably switchable interconnecting device, of said plurality of addressably switchable interconnecting devices, for converting between the AXI streaming protocol and the second streaming protocol; a first high-speed transceiver that is connected through an interconnection to the first protocol converting device; a second high-speed transceiver that is connected through an interconnection to the second protocol converting device; and a transceiver-transceiver interconnection connected between the first high-speed transceiver and the second high-speed transceiver.

Yet a further embodiment is an electronic communication system wherein the first addressably switchable interconnecting device, the first protocol converting device, the first high-speed transceiver, the second addressably switchable interconnecting device, the second protocol converting device, and the second high-speed transceiver are all arranged on a single circuit board.

Yet a still further embodiment is an electronic communication system wherein the first addressably switchable interconnecting device, the first protocol converting device, and the first high-speed transceiver are all arranged on a first circuit board, and the second addressably switchable interconnecting device, the second protocol converting device, and the second high-speed transceiver are all arranged on a second circuit board.

Yet even another embodiment is an electronic communication system wherein the second streaming protocol is an AMD Aurora protocol. Note that the Aurora protocols were originally developed by Xilinx, Inc., currently owned by Advanced Micro Devices, Inc., where "AMD," "Xilinx," and "Aurora" are trademarks or registered trademarks of Advanced Micro Devices, Inc., and no claim is made by the applicant to any of these trademarks. Note also that "AMD Aurora protocol" as used here is intended to include the Aurora 8B/10B protocol and the Aurora 64B/66B protocol, developed by Xilinx, Inc., as well as all existing or future improvements and adaptations thereof.

Yet an even further embodiment is an electronic communication system wherein the transceiver-transceiver interconnection is a backplane, an optical connector, or a high-speed printed circuit board trace.

Still even another embodiment is an electronic communication system wherein the first circuit board and the second circuit board are disposed in separate slots.

Still an even a further embodiment is an electronic communication system wherein the first circuit board and the second circuit board are disposed in separate boxes.

Still yet another embodiment is an electronic communication method including the steps of: generating a routing header and prepending it to data in a stream in a source endpoint device that is connected to an endpoint of a field programmable grid array; shifting the routing header, which is the first beat of an AXI stream packet, through a first-in/first-out buffer under AXI streaming control; shifting the routing header through a single-beat buffer under AXI streaming control; applying the routing header to a switch destination output port signal generating device to generate and latch a switch destination output port signal; applying the switch destination output port signal to an AXI stream switch to establish a connection between a first input/output port of that switch and a second input/output port of that switch; shifting the first beat of the AXI streaming packet into a second single-beat buffer, connected to the second input/output port, under AXI streaming control; shifting the first beat of the AXI streaming packet into a destination end point; streaming payload data through a circuit that has been established, under AXI streaming control; identifying the last beat in the stream; unlatching the switch destination output port signal; and shifting the last beat of the AXI stream to a destination endpoint.

Still yet a further embodiment is an electronic communication method further including the steps of: comparing a number of words of data received to a stream length field in the routing header to evaluate whether or not the entire AXI stream has been received; and if the entire AXI stream has not been received, using the same steps as in claim 16 to send back, to the source end point, a message indicating that there has been a communication failure.

Still yet a still further embodiment is an electronic communication method further including the steps of: comparing a number of words of data received to a stream length field in the routing header to evaluate whether or not the entire AXI stream has been received; and if the entire AXI stream has been received, using the same steps as in claim 16 to send back, to the source end point, a message indicating that the communication has been successful.

Still yet even another embodiment is an electronic communication method further including the steps of: shifting a beat of the AXI stream from a second single-beat buffer into a first protocol converter to convert to a beat of a stream of a second streaming protocol; transmitting a beat of the stream of the second streaming protocol from a first high-speed transceiver through an interconnection to a second high-speed transceiver; converting a beat of the stream of the second streaming protocol into an AXI stream in a second protocol converter; and shifting a beat from the second protocol converter into a first-in/first-out buffer.

Still yet even an even further embodiment is an electronic communication method wherein the second streaming protocol is an AMD Aurora protocol.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 3 is a routing header definition illustrating the packet structure used in the AXI streaming protocol used in the data communication system in accordance with the embodiment depicted in FIG. 1.

FIG. 4A is a table illustrating a lookup table used in an AXI stream interconnect used in the data communication system in accordance with the embodiment depicted in FIG. 1.

FIG. 4B is another table illustrating a lookup table used in an AXI stream interconnect used in the data communication system in accordance with the embodiment depicted in FIG. 1.

FIG. 9 is a routing header definition table illustrating a packet structure used in an electronic communication system in accordance with the embodiment depicted in FIG. 8.

FIG. 10 is a table illustrating a lookup table used in a first AXI stream interconnect, on a first card, used in an electronic communication system in accordance with the embodiment depicted in FIG. 8.

Figure 1:
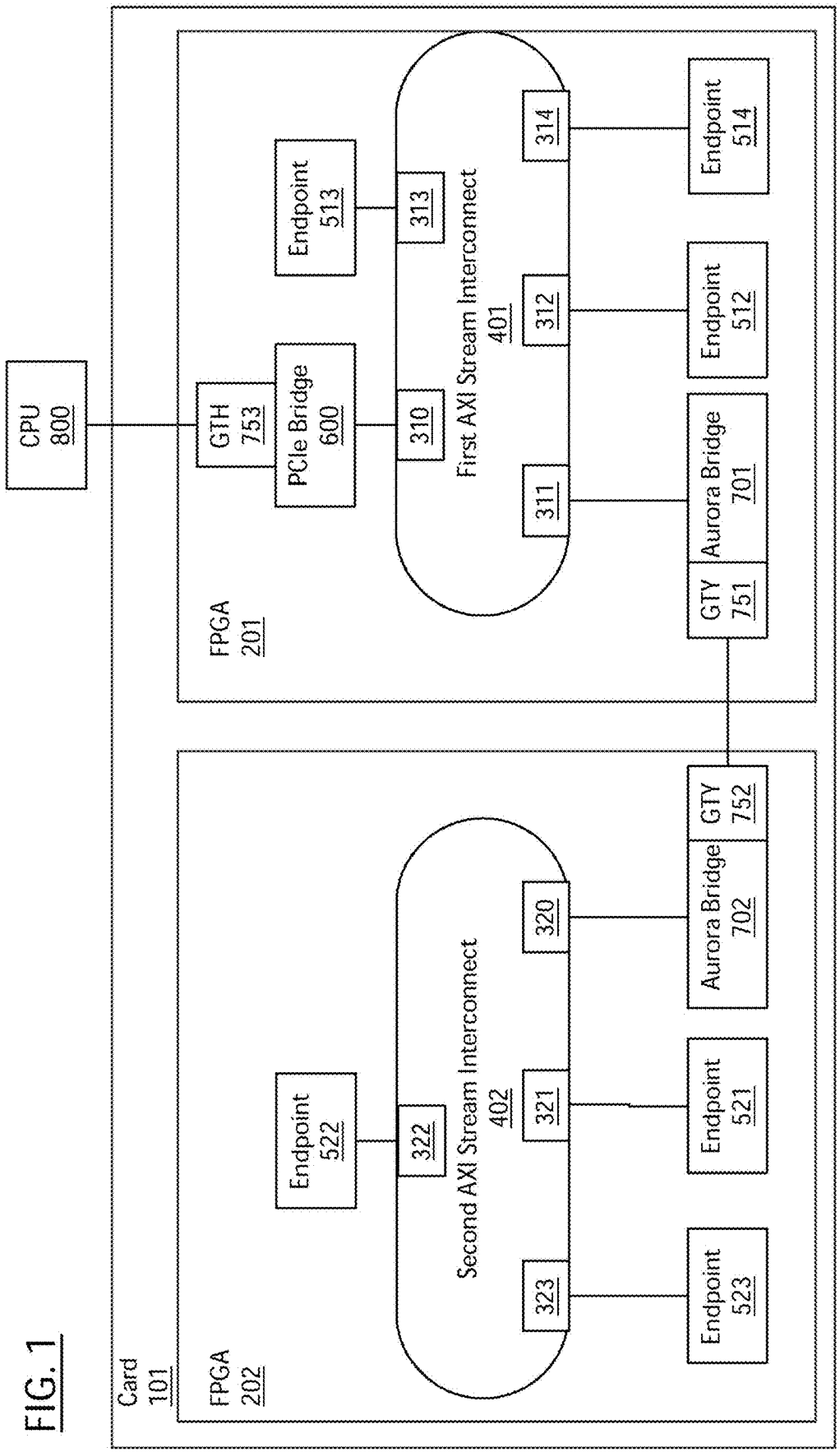
FIG. 1 is a block diagram illustrating an electronic communication system in accordance with one embodiment, wherein an addressable AXI streaming protocol is used for communication with multiple endpoints on first and second addressably switchable interconnecting devices (AXI stream interconnects) on a single electronic circuit board (card).

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

One embodiment leverages the Advanced extensible Interface (AXI) stream protocol, a well-established and widely-used communication standard in the field of digital electronics. Unlike conventional point-to-point protocols, the AXI stream protocol, as adapted by this embodiment, produces an addressably switchable interconnecting device that allows for dynamic data routing in a streamlined and efficient manner. By integrating efficient addressing capabilities into AXI stream point-to-point communication, this embodiment provides a novel and inventive solution that enables precise, real-time, and high-speed data exchange between specific modules within a complex digital system.

Embodiments further combine another point-to-point communication protocol, following the Aurora standard, to enable the efficiency of simple point-to-point protocol communications to be expanded into a complex communication structure that extends between multiple boards and devices. This approach to low-overhead and high-speed addressability in the modified AXI stream protocol, when combined with the greater physical distances that can be spanned through combination with the Aurora standard, significantly enhances the scope and flexibility of data communication within complex electronic systems while preserving the efficiency and low-overhead of point-to-point communication protocols.

The detailed description that follows illustrates embodiments, outlining novel features and advantages of employing the AXI protocol in a broadly addressable context. By enhancing the capabilities of AXI-based communication, these embodiments open new avenues for seamless integration, data exchange, and collaboration among various electronic modules while reducing, by orders of magnitude, the overhead that is required by conventional addressable systems (such as Ethernet), thereby revolutionizing the field of electronic systems design.

In embodiments, a dynamic routing function is added to the AXI streaming protocol through additions to the conventional AXI stream interconnect hardware and modification of the header in the AXI streaming protocol. While conventional FPGA (field programmable gate arrays) have had routing elements, known as "AXI-stream interconnects," for receiving an AXI stream from an input port (often referred to as a "master") and routing that stream to one or more output ports depending on a predefined routing map, in the conventional AXI-stream interconnect, this mapping of input port to output port has been static, precluding functionality wherein streams are routed dynamically and in real time based on addressing information. While the AXI-stream interconnect is "field programmable" (enabling the topology of the interconnections in the FPGA to be programmed in the field), it is important to note that this in no way implies that the AXI-stream interconnect has a function that enables broad "addressability"; the "programming in the field" involves changing the content of a static RAM, and unlike the dynamic routing functionality that is necessary for electronic communications, this field programming is extremely time-consuming, and thus is unsuitable for use in real-time switching for electronic communications. The dynamic routing function that is added to the AXI streaming protocol in the embodiments set forth below is beyond merely changing addresses in an interconnect, but must be considered a fundamental change in design or architecture of the FPGA fabric itself. To date, there has been no function enabling the routing through an AXI-stream interconnect to be changed dynamically on a stream-by-stream basis to route AXI streams based on the content of the particular stream.

In the embodiments described herein, however, the basic hardware of the AXI-stream interconnect may be modified through the addition (either within the interconnect or as an external device) of a first-in/first-out (FIFO) buffer to accept a routing header that includes destination information, in addition to payload data, and a lookup table (LUT) that receives the destination information to produce an address signal that selects the port in the AXI stream interconnect to output the AXI stream. This structure, which will be described in greater detail below, enables an AXI stream that is applied to the input port to be outputted selectively to an output port of the AXI-stream interconnect, depending on the destination information that has been applied. Note that this destination information is beyond merely the "TDEST" signal that has been present as an optional signal in the conventional AXI stream protocol, but rather broadly includes information that can be used flexibly to determine the routing of a signal depending a variety of factors, such as the location of the AXI-stream interconnect in a broader system, the location of the input port within that stream interconnect, and the like.

The conventional AXI streaming protocol may also be modified in embodiments, through prepending a routing header beat (routing header 50), described below in reference to FIG. 3, onto each packet of AXI stream data.

When a packet is received into the AXI stream interconnect, the routing header 50 is applied to a lookup table (a switch destination output port signal generator) within the applicable input/output port of the AXI stream interconnect to determine which, of a plurality of ports of the AXI stream interconnect, is to be used for outputting the packet, to thereby generate a TDEST signal (a switch destination output signal) that is to be applied to the AXI stream switch (a stream switch) within the AXI stream interconnect to route the packet from an input port (a first input/output port) of the AXI stream switch to a given output port (a second input/output port) of the AXI stream switch, as will be described in detail below. Each output port may be connected point-to-point to another device, which may be, for example, an endpoint in a FPGA (field-programmable gate array), an input port of another AXI stream interconnect, or a protocol converter (for converting, for example, into a PCIe protocol, an Aurora protocol, or the like).

Various embodiments, as illustrated in the appended drawings, will be described below. FIG. 1 depicts schematically a data communication system according to an embodiment, wherein an addressable AXI streaming protocol is used for communication between a CPU 800 and multiple endpoints 512 through 514 and 521 through 523 that are connected to two AXI stream interconnects 401 and 402 that are on a single circuit board or fabricated in a single substrate (hereinafter termed a "card") 101. More detail about the internal structures of these AXI stream interconnects 401 and 402 will be described below. The endpoints 512 through 514 are connected via wires, traces, metal interconnect layers, or other conductive substances (not numbered, hereinafter termed generically "interconnections") to an AXI stream interconnect 401 through respective input/output (I/O) ports 312 through 314. Note that in this embodiment, an "interconnection" comprises multiple parallel traces or conductive substances, configured so as to enable AXI communications following well-known standards, which will not be described here. The endpoints 521, 522, and 523 are connected via respective interconnections to an AXI stream interconnect 402 through respective I/O ports 321, 322, and 323. A CPU 800 may be connected via interconnections through a transceiver 753, a PCIe converter 600, and an I/O port 310 to the AXI stream interconnect 401. The AXI stream interconnect 401 is connected to a first protocol converting device (Aurora converter 701, for converting between the AXI stream protocol and a second streaming protocol, which, in embodiments, may be an AMD® Aurora protocol), via interconnections, through an I/O port 311. The Aurora converter 701 of a first FPGA 201 may be connected via a first high-speed transceiver 751, a transceiver-transceiver interconnection (a well-known Aurora-compatible interconnection, which may comprise high-speed printed circuit board traces or other electrical interconnections), and a second high-speed transceiver 752 to a second protocol converting device (Aurora converter 702, which has the same functions as the aforementioned Aurora converter 701) of a second FPGA 202. This Aurora converter 702 may be connected, via interconnections, through an I/O port 320 to a second AXI stream interconnect 402. This second AXI stream interconnect 402 may be connected via ports I/O 321, 322, and 323 to respective endpoints 521, 522, and 523.

Here, the PCIe converter 600 may be a well-known IP (intellectual property) block for conversion between the AXI stream protocol and the PCIe communication protocol, such as available from the AMD IP catalog, and will not be described in detail herein. The transceiver 753 may be a well-known transceiver, such as a GTH transceiver that is available from AMD, for communicating with a device through a backplane, or the like, and will not be described in detail herein. The CPU 800 may be a processing system for executing programs and carrying out instructions in response to inputs from external devices (not shown) and from the FPGA 201, to send data and commands to, and receive data and commands from, the endpoints 512 through 514 and 521 through 523 through the system illustrated in FIG. 1, and also to exchange data with external devices (not shown). Note that here the term "CPU" refers not just to a single microprocessor chip, but rather is a general term that includes complex data processing systems including storage devices, display devices, input output devices, and the like, and all necessary interfacial and peripheral equipment as is well known in the art.

The endpoints 512 through 514 and 521 through 523 are endpoints as are commonly known in the art of FPGA design for interfacing with endpoint devices that may include, for example, network interface cards (NICs), solid-state drives (SSDs), data acquisition cards, graphics processing units (GPUs), storage controllers, cryptography accelerators, sensor interfaces, high-performance computing (HPC) accelerators, and the like. Note that each of these endpoints has a one-to-one correspondence with a corresponding I/O port 310 through 314 and 320 through 323 of an AXI stream interconnect 401 or 402.

While the card 101, endpoints 512 through 514 and 521 through 523, AXI-PCIe converter 600, transceivers 751, 752, and 753, and CPU 800, described above, all use conventional known technologies commonly used in structuring systems around FPGAs, the AXI stream interconnect 401 and 402 of this embodiment is a novel device that will be described in detail. Unlike a conventional AXI stream interconnect, the novel AXI stream interconnects 401 and 402 of this embodiment are provided with a structure that enables dynamic routing functions.

The I/O ports 310 through 314 and 320 through 323 are constituent elements of the AXI stream interconnects 401 and 402, and have structures that differ from the structures of I/O ports in conventional AXI stream interconnects, as will be described next using FIG. 2A through FIG. 2B.

Figure 2A:
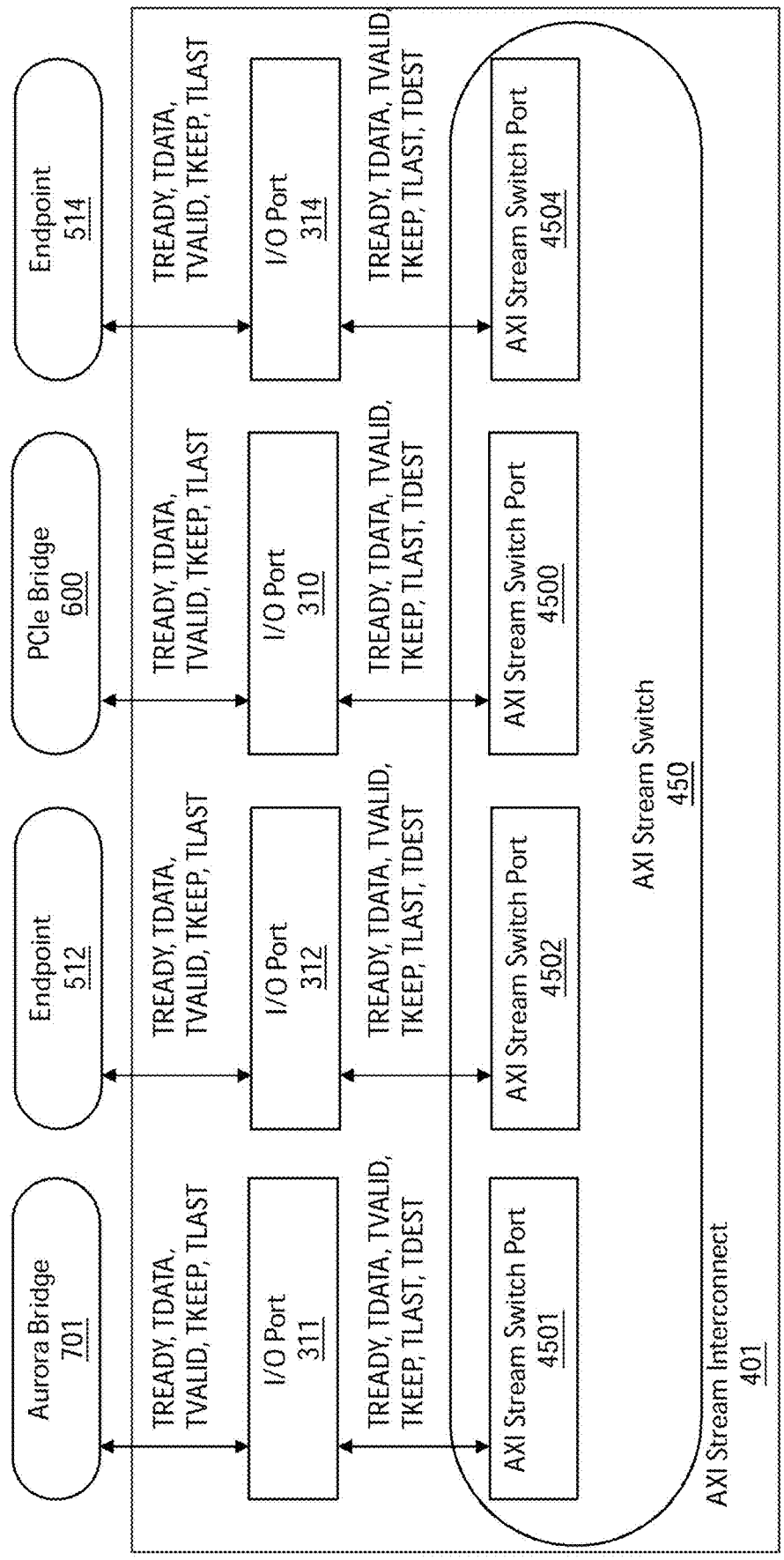
FIG. 2A is a block diagram illustrating the internal structure of a portion of an AXI stream interconnect in the electronic communication system in accordance with the embodiment depicted in FIG. 1.

FIG. 2A is a diagram depicting detailed structures of the AXI stream interconnect 401 depicted in FIG. 1, comprising I/O ports 310, 311, 312, and 314 and an AXI stream switch 450. The AXI stream switch 450 may be, for example, a well-known AXI stream switch such as can be found in the AXI4-Stream Infrastructure IP Suite (PG085), available from AMD. FIG. 2A shows connections of the I/O ports 310, 311, 312, and 314 of the AXI stream interconnect 401 to the AXI-PCIe converter (AXI bridge) 600, Aurora converter 701, endpoint 512, and endpoint 514, respectively, that are depicted in FIG. 1, and to respective AXI stream switch ports 4500, 4501, 4502, and 4504. Each of these I/O ports 310, 311, 312, and 314, as well as I/O ports 313 and 320 through 323, have identical architectures; each may be structured identically to the I/O port 30 that is depicted in FIG. 2C, described below. Note that while FIG. 1 depicts four and five ports in the AXI stream interconnects 401 and 402, respectively, and FIG. 2 depicts only four ports in the AXI stream interconnect 401 and two ports in the AXI stream interconnect 402, these numbers of ports are merely for ease in illustration, and there is no limitation to these specific numbers. In other embodiments there may be as few as three ports, or there may be six or more ports. In this embodiment let us assume that each AXI stream interconnect 401 and 402 has sixteen input/output ports. Note also that while only six endpoints are depicted in FIG. 1, this is just for brevity in the illustration. Any number of endpoints may be provided associated with corresponding ports, and these may be combined with any number of PCIe converters and Aurora converters, associated with their corresponding ports. Conversely, although not illustrated here, a port of an AXI stream interconnect may be connected, via an interconnection, directly to a port of another AXI stream interconnect.

As illustrated in FIG. 2C, each I/O port 30 comprises a data first-in/first-out buffer (FIFO buffer 31), a first single-beat buffer (register slice buffer 32), a switch destination output port signal generating device (destination extracting unit 33), and a second single-beat buffer (register slice buffer 34). Each of these elements are connected via interconnections, as depicted by the respective arrows in FIG. 2C. The interconnections here are understood to be parallel interconnections with an adequate number of traces to carry a data signal, being the slice data TDATA that will be described using FIG. 3, below, with additional traces to carry the control signals, TVALID, TREADY, TKEEP, and TLAST, that are conventionally used in AXI streaming. The aforementioned data signal, combined with the aforementioned control signals, together may be termed "AXI streaming protocol signals," where a series of such AXI streaming protocol signals may be termed a "data stream."

Each I/O port 30 (I/O ports 310, 311, 312, and 314, and I/O ports 313 and 320 through 323) may be connected to an AXI stream switch port 46 (AXI stream switch ports 4500, 4501, 4502, and 4504, and 4510 and 4513) of an AXI stream switch 45. As illustrated in FIG. 2C, the AXI stream switch 45 is to be understood to be configured so as to include an AXI stream switch port 46, which includes an AXI streaming input port 461 for receiving the data signals and control signals of the standard AXI streaming protocol, listed above, and also an AXI streaming output port 462 for transmitting these same signals of the AXI streaming protocol. The AXI stream switch 45 also includes all other AXI stream switch features and functions that are commonly known in the art of AXI streaming communication, such as switching between input and output functions, arbitration/collision resolution, and the like. The AXI stream switch port 46 further includes inputs to accept four bits of address information of a switch destination output port signal (TDEST), described below, for establishing routing between an input port and an output port in the AXI stream switch 45, as will be described below. Note that while in this embodiment the address information TDEST comprises four bits of address information, the number of bits is arbitrary, enabling the disclosed addressing scheme to be applied to AXI stream switches with greater numbers of ports.

The FIFO buffer 31 may be a conventional FIFO buffer as is commonly used in AXI stream communications. In this embodiment, the FIFO buffer 31 has a data width of 512 bits, and a depth of, for example, 2048 words. The FIFO buffer 31 may be configured so as to be controlled through control signals, which are standard AXI streaming control signals: TVALID, TREADY, TKEEP, and TLAST. As is standard in AXI streaming, the FIFO buffer 31 may be configured so as to accept beats of data TDATA from an upstream connection 550, which in the case of the I/O port 310, for example, that is illustrated FIG. 2A would be the PCIe converter 600, with each strobe of a clock signal, not shown, insofar as the upstream connection 550 is asserting the TVALID control signal and there is room in the FIFO buffer 31. The control of data shifting through the FIFO buffer 31 from the upstream connection 550 to the downstream device, which in this case is the first register slice buffer 32, based on the TVALID, TREADY, and TKEEP control signals, is well known in the art, and need not be described here.

In this embodiment the first and second register slice buffers 32 and 34 are single-beat (512-bit) registers that are controlled through the standard AXI streaming control signals TVALID, TREADY, and TKEEP; however, there is no limitation thereto, and these may instead be multibeat buffers, or may be omitted if not required. In this embodiment these first and second register slice buffers 32 and 34 are provided to facilitate timing adjustments, as will become apparent below.

The destination extracting unit 33 may be a device that comprises a lookup table, as will be described below, using FIG. 4 and FIG. 9, configured so as to input the AXI streaming data signal TDATA and control signals TVALID, TKEEP, and TLAST from the first register slice buffer 32, the TREADY control signal from the downstream device, which in this case is the AXI streaming input port 461 of the AXI stream switch port 46 of the AXI stream switch 45, and clock signals, not shown, and configured so as to output the TREADY control signal to the upstream first register slice buffer 32, and also so as to output not only the AXI streaming signals of the data signals TDATA and control signals TVALID, TKEEP, and TLAST to the AXI streaming input port 461, but also a four-bit address signal TDEST. As will be described below, the destination extracting unit 33 may be configured so that, upon receipt of the routing header 50 that is the first beat in a data packet that is received in an AXI data stream, destination data within that routing header, described below, will be applied to a lookup table, to produce the four-bit address signal TDEST that is outputted from the destination extracting unit 33 to the AXI streaming input port 461. In embodiments, the lookup table, which will be described in reference to FIG. 4 and FIG. 9, may be programmed in advance. In alternate embodiments, however, this lookup table may be field-programmable instead. The destination extracting unit 33 may be configured so that once an address TDEST is outputted from the destination extracting unit 33, outputting of that address TDEST is latched in the destination extracting unit 33 and held constant throughout the subsequent data stream until the AXI streaming control signal TLAST is received from the first register slice buffer 32. In this embodiment, a beat is identified as being the routing header 50 by being the first beat received by the destination extracting unit 33 when in a state that the address signal TDEST is not latched, that is, the first beat received after the assertion of a TLAST signal from the first register slice buffer 32. Note that the destination extracting unit 33 may be configured so as to assert the TVALID signal only after the address signal TDEST, together with the TDATA signal, has stabilized. The specific design of the destination extracting unit 33 to provide the functionality set forth above is well known in the art of lookup tables, and thus no detailed design will be described in this specification.

The AXI stream switch 45 may be configured so as to include all of the functions of a conventional AXI stream switch, including flow control (handling of the TVALID, TKEEP, TLAST, and TREADY signals, etc.), collision avoidance, and the like. As these functions are well-known in the art, there is no need for detailed descriptions here. However, unlike a conventional AXI stream switch, the AXI stream switch 45 in this embodiment includes, in the AXI streaming input port 461 of the AXI stream switch port 46, an additional four input lines, for applying the address data TDEST for dynamically routing the switch, enabling all AXI streaming signals to be routed to the AXI streaming output port 462 of that specific AXI stream switch port 46, of the plurality of AXI stream switch ports 4501 through 4504 within the AXI stream switch 450 of this embodiment, as illustrated in FIG. 2A, that corresponds to the address data TDEST on the four input lines. The specific structure of the AXI stream switch 45 (450), each AXI stream switch port thereof having the four additional input lines for inputting address data TDEST, and having the function for switching the connections between input ports and output ports depending on the asserted address data TDEST, should be obvious to one skilled in the art using, for example, the conventionally available AMD IP that is referenced above, so detailed structures for the workings of the AXI stream switch 450 are omitted from this Specification.

The AXI streaming output port 462 of the AXI stream switch port 46 may also be connected, via an interconnection, to the second register slice buffer 34. As with the first register slice buffer 32, this may be a single-beat (512-bit) register that is controlled through the standard AXI streaming control signals TREADY, TVALID, and TKEEP. In embodiments this second register slice buffer 34 may be provided to facilitate timing adjustments and to latch and stabilize the signals that pass through the AXI stream switch 45.

Figure 2B:
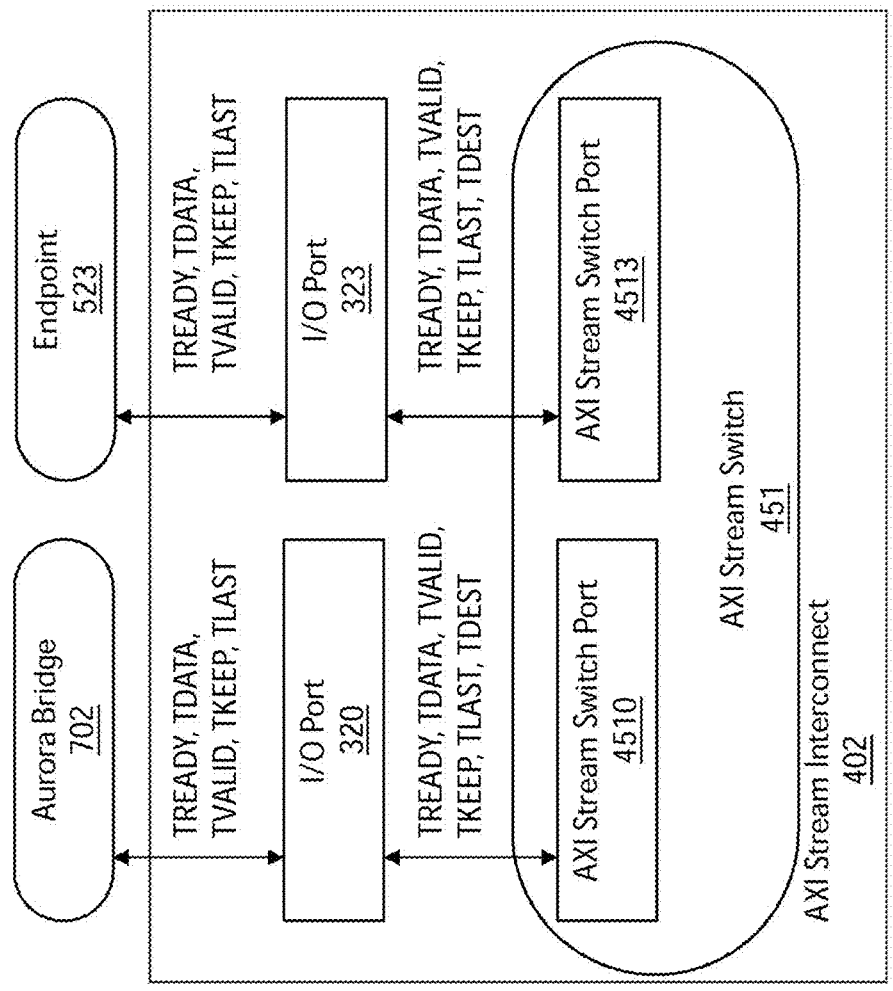
FIG. 2B is a block diagram illustrating the internal structure of a portion of another AXI stream interconnect in the electronic communication system in accordance with the embodiment depicted in FIG. 1.
Figure 2C:
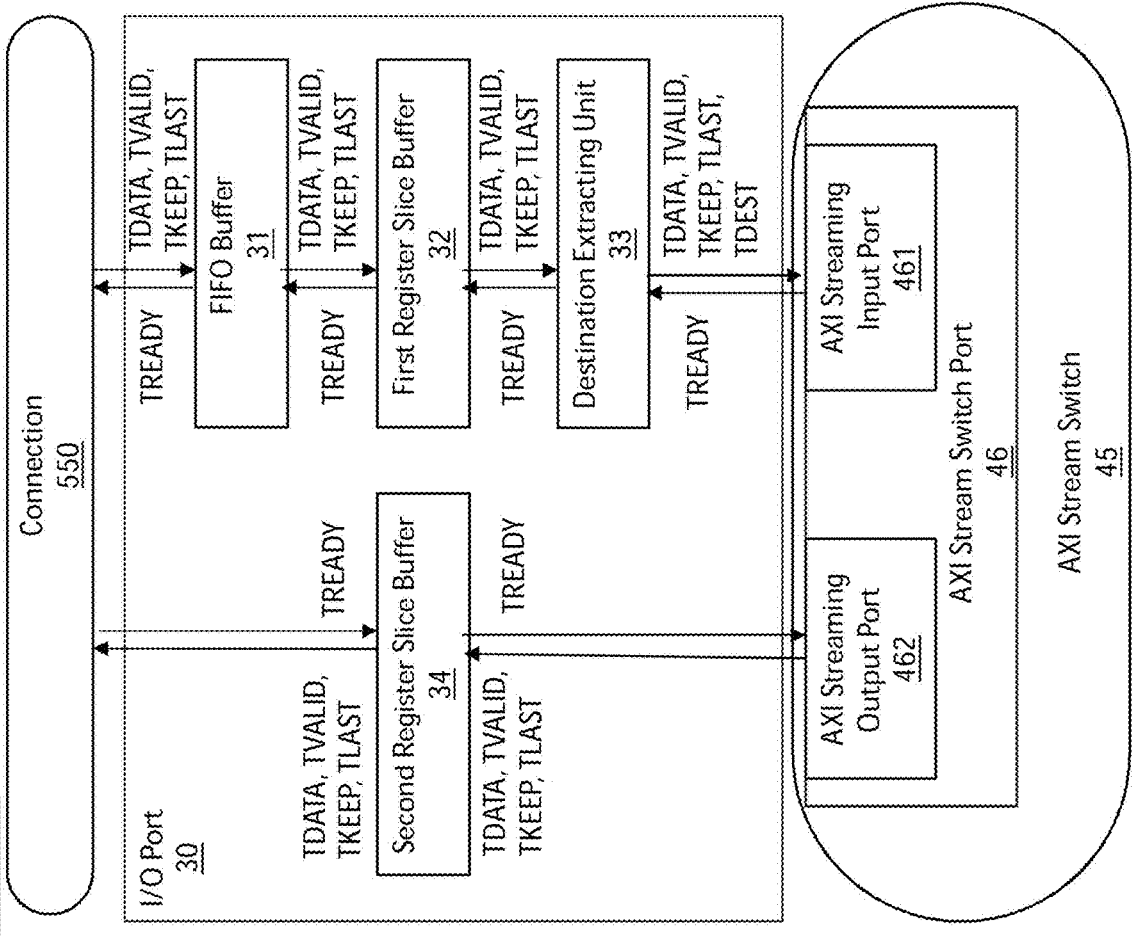
FIG. 2C is a block diagram illustrating the internal structure of the I/O ports shown in FIG. 2A and FIG. 2B, for providing an addressability function.

Both of the AXI stream interconnects 401 and 402, depicted in FIG. 2A and FIG. 2B respectively, with their respective input/output ports 310 through 314 and 320 through 323, are structured identically to that which is described above (albeit with greater numbers of I/O ports 30 and AXI stream switch ports 46), so do not need to be described separately.

The Aurora converters 701 and 702 are known converters that convert between the AXI stream protocol and the Aurora communication protocol. Although there is no limitation thereto, the Aurora converter in this embodiment may use the Aurora 64B/66B IP from AMD; however, any appropriate converter for converting between the AXI stream protocol and the Aurora communication protocol may be used for the Aurora converters 701 and 702. The Aurora converters 701 and 702 are connected together through an appropriate medium. This medium may be interconnect traces.

As with the above, the PCIe converter 600 may be a known converter that converts between the AXI stream protocol and the PCIe communication protocol. Although there is no limitation thereto, the PCIe converter may use an AMD DMA/Bridge Subsystem for PCE Express IP; however, any appropriate converter for converting between the AXI stream protocol and the PCIe communication protocol may be used for the PCIe converter 600. The PCIe converter 600 may be connected to the CPU 800 through an appropriate transceiver 753. Although there is no limitation thereto, in this embodiment the transceiver 753 may be a high-performance gigabit transceiver such as an UltraScale™ GTH, available from AMD, to enable connection to the CPU through a backplane, not shown. The selection of the appropriate transceiver 753 may be determined by one skilled in the art based on power budgets, required performance, cost factors, and the like.

A format of an AXI streaming packet, including the aforementioned routing header 50, according to this embodiment will be described next.

A single-beat AXI routing header may be added at the head of the AXI streaming packet. As defined in FIG. 3, this routing header includes, in a prescribed sequence, data indicating the source of the data stream and data indicating the destination to which the data stream is to be routed. Although there is no limitation thereto, in embodiments the data indicating the source of the data stream include a one-byte source interconnect ID and a one-byte source port ID, and the data indicating the destination to which the data stream is to be routed may include a one-byte destination interconnect ID and a one-byte destination port ID. That is, as depicted in FIG. 3, the AXI routing header includes a source AXI interconnect port ID field (Src Port ID), a source AXI interconnect ID field (Src Interconnect ID), a destination AXI interconnect port ID field (Dst Port ID), and a destination AXI interconnect ID field (Dst Interconnect ID). Although there is no limitation thereto, in this embodiment the routing header 50 may be generated by the endpoint device, or the CPU 800, that is the source of the stream. In this embodiment, the routing header 50 also includes, at a prescribed location within the routing header 50, data indicating a payload length. The source interconnect ID and source port ID enable the endpoint that receives a stream to discern the origin of the stream. This information can be used to send return messages, such as a message indicating that data has been received successfully or a message indicating that data has been lost. The destination interconnect ID and the destination port ID are used through application to the lookup table, described above, within a destination extracting unit 33, to enable dynamic routing of the AXI stream.

Note that the CPU 800 may have, stored within a memory thereof, not shown, a list of locations of the devices to which it may send streams on the various endpoints, or otherwise may be programmed to address each endpoint device using the applicable destination interconnect ID and destination port ID. How the CPU 800 determines the destination interconnect ID and the destination port ID is outside the scope of this disclosure, but can be determined as appropriate by a person skilled in the art. Interconnect IDs and port IDs may be assigned based on the physical or logical locations of the interconnects and ports.

FIG. 4 will be referenced to describe two examples of lookup tables, where FIG. 4A depicts an example of a routing table that may be found in, for example, I/O port 312 of AXI stream interconnect 401 in FPGA 201 in FIG. 1, and FIG. 4B depicts an example of a routing table that may be found in, for example, I/O port 322 of AXI stream interconnect 402 in FPGA 202 in FIG. 1. Here let us assume, arbitrarily, that the one-byte interconnect ID of the AXI stream interconnect 401 is 0x5A and that the one-byte interconnect ID of the AXI stream interconnect 402 is 0x5B. Let us further assume that the ports depicted in FIG. 1 have the following port IDs:

| | |
|---|---|
| I/O Port 310 | Port ID 0x00 |
| I/O Port 311 | Port ID 0x01 |
| I/O Port 312 | Port ID 0x02 |
| I/O Port 313 | Port ID 0x03 |
| I/O Port 314 | Port ID 0x04 |
| . . . | . . . |
| I/O Port 320 | Port ID 0x00 |
| I/O Port 321 | Port ID 0x01 |
| I/O Port 322 | Port ID 0x02 |
| I/O Port 323 | Port ID 0x03 |
| . . . | . . . |

Note that although in the above it appears as though port IDs are assigned redundantly to multiple ports, unique addressing is preserved through these ports with redundantly-assigned port IDs being parts of different AXI stream interconnects that have different AXI stream interconnect IDs.

Let us further assume, arbitrarily, that the AXI stream interconnects are each configured so that, when the addresses signal TDEST is asserted at any AXI streaming input port 461, that AXI streaming input port 461 will be connected to the AXI streaming output port 462 that connects to the corresponding I/O port 30 as follows (where the suffix "b" indicates that this is a binary number):

Routing within AXI Stream Interconnect 401

| | |
|---|---|
| TDEST = 0000b | Connects to I/O Port 310 |
| TDEST = 0001b | Connects to I/O Port 311 |
| TDEST = 0010b | Connects to I/O Port 312 |
| TDEST = 0011b | Connects to I/O Port 313 |
| TDEST = 0100b | Connects to I/O Port 314 |
| . . . | . . . |

Routing within AXI Stream Interconnect 402

| | |
|---|---|
| TDEST = 0000b | Connects to I/O Port 320 |
| TDEST = 0001b | Connects to I/O Port 321 |
| TDEST = 0010b | Connects to I/O Port 322 |
| TDEST = 0011b | Connects to I/O Port 323 |
| . . . | . . . |

In FIG. 4A, the lookup tables in the destination extracting units 33, in the I/O ports 30 (310, 311, 312, and 314) of the AXI stream interconnect 401 are constructed so that if the destination interconnect ID is 0x5A, the destination port ID will be used to output an address signal TDEST that will cause the AXI stream switch 450 in FIG. 2A to connect the AXI streaming input port 461 of the applicable AXI stream switch port 46, into which the address signal TDEST is inputted, to the AXI streaming output port 462 of the corresponding AXI stream switch port 46. However, if the destination interconnect ID is 0x5B, the destination port ID will, at this point, be ignored, and an address signal TDEST will be outputted that will cause the AXI stream switch 450 to connect to the AXI streaming output port 462 of the AXI stream switch port 4501, depicted in FIG. 2A, which connects to the Aurora connector 701, which, as will be described below, ultimately connects to the other AXI stream interconnect 402 in the other FPGA 202. Note that invalid combinations of destination interconnect IDs and destination port IDs are also contemplated. For example, a destination interconnect ID of 0x5A combined with a destination port ID 0x01 from the endpoint 512 in the configuration illustrated in FIG. 1 and FIG. 2A could cause a stream, having the first AXI stream interconnect 401 as the destination, to be routed to the port 311, which would route the signal away from the first AXI stream interconnect 401 to the second AXI stream interconnect 402 instead. To prevent this, the lookup table, as depicted in FIG. 4, in the destination extracting unit 33 may be constructed so that the TVALID signal outputted therefrom is held low, and the TREADY signal outputted therefrom to be held high, if the combination of the Dst Interconnect ID and Dst Port ID would result in invalid routing. This invalid combination results in the AXI stream switch 45 ignoring the AXI stream signals applied thereto, causing the AXI stream to be discarded. In another embodiment, the same effect can be achieved by the lookup table (not illustrated) that is designed so as to cause the destination extracting unit 33 to output, for an invalid combination of interconnect ID and port ID, a TDEST signal that the AXI stream switch 45, by the design thereof, interprets as indicating a dummy port, with the AXI stream switch 45 accepting and discarding the AXI stream. The AXI stream switch 45 may be configured so as to discard a TDEST signal that would route an AXI stream to the AXI streaming output port 462 that is connected to the same I/O port 30 from which said stream is inputted. Such a configuration prevents the possibility of an errantly-addressed routing header 50 could causing faulty operation of the electronic communication system, such as looped or recursive routing.

Figure 5:
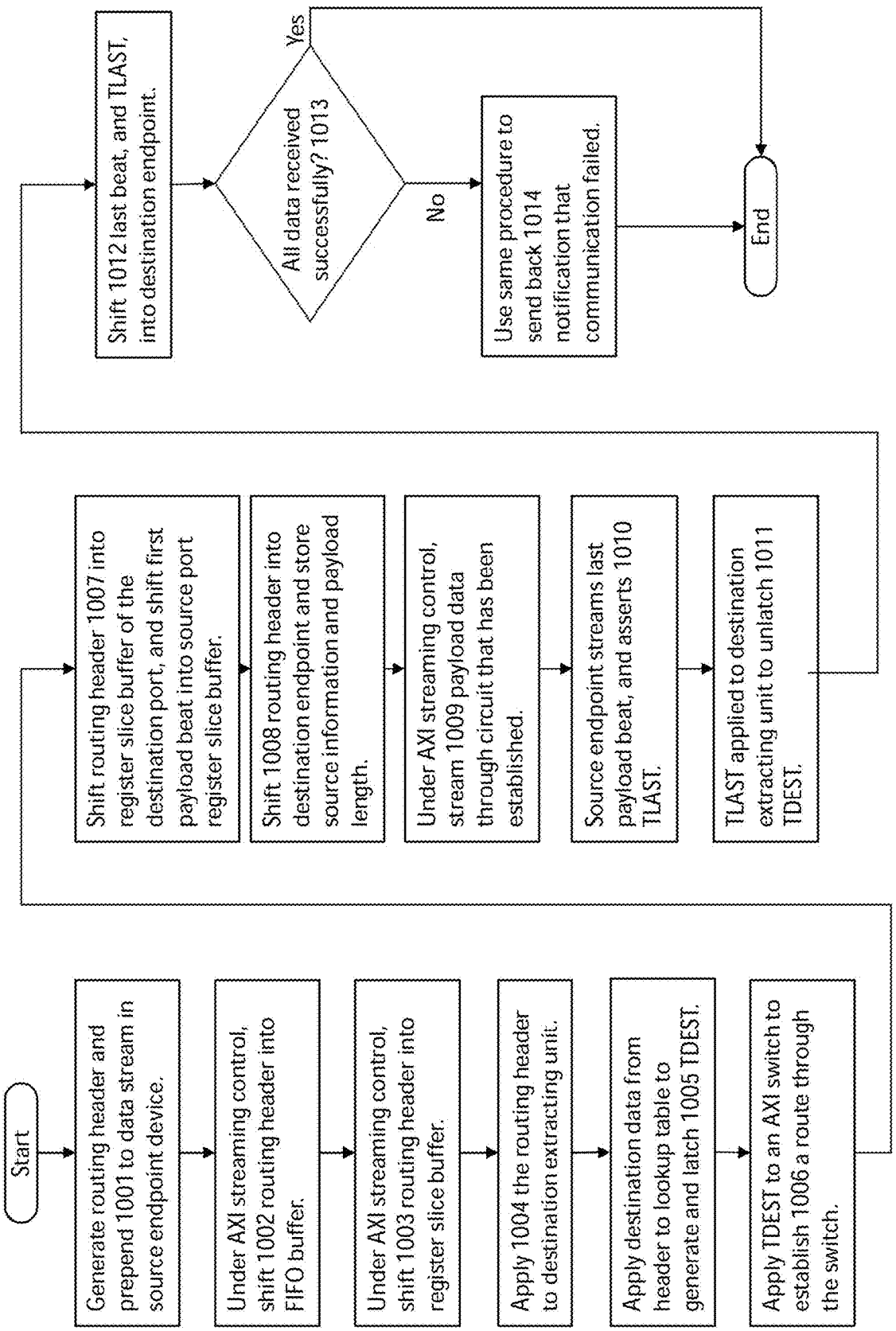
FIG. 5 is a flow chart for describing a method for electronic communication in accordance with the embodiment depicted in FIG. 1.
Figure 6:
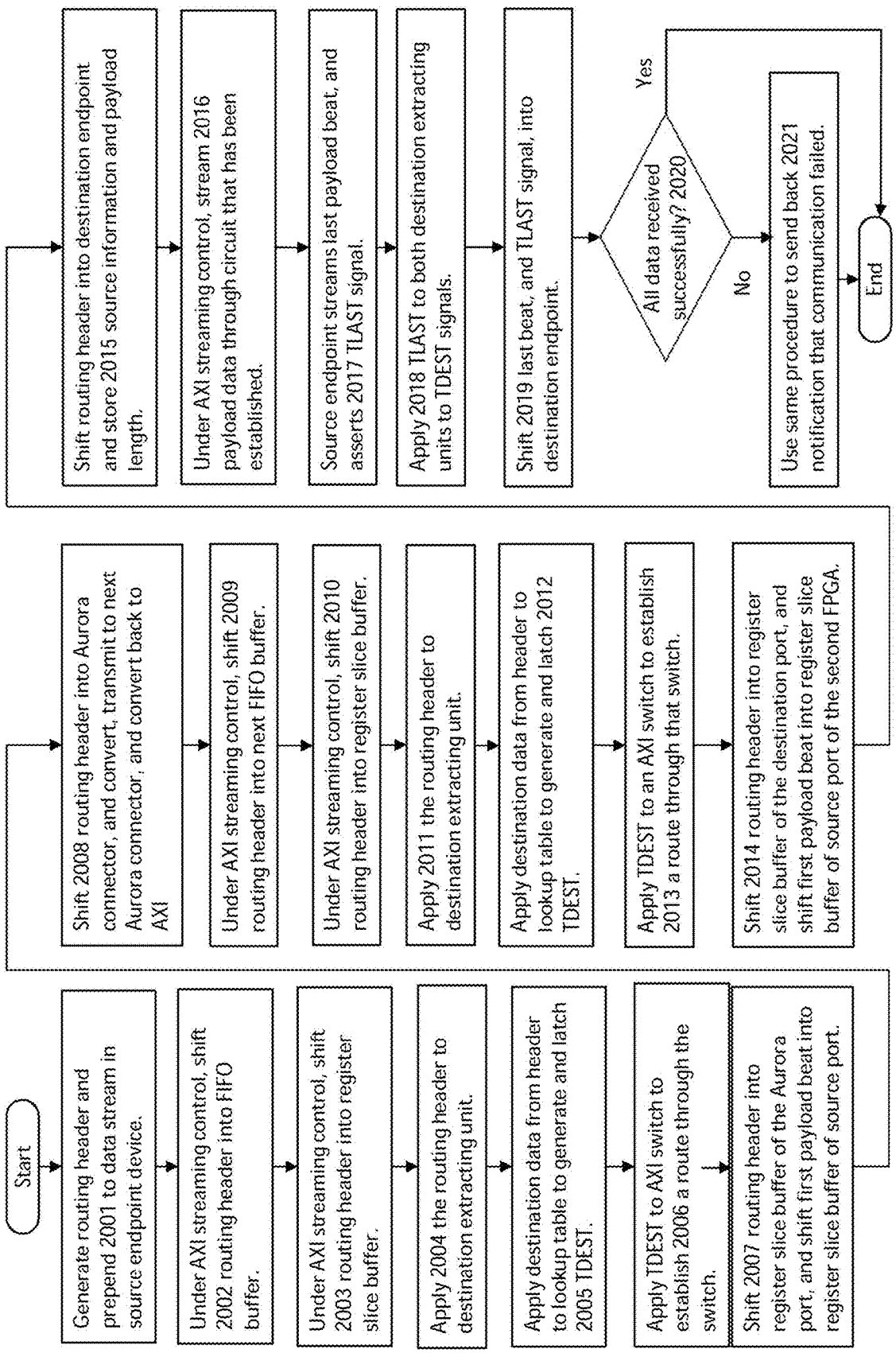
FIG. 6 is a flow chart for describing another method for electronic communication in accordance with the embodiment depicted in FIG. 1.

The operation in this embodiment will be described below, in reference to FIG. 5 and FIG. 6. Let us first assume a scenario where the endpoint device (not shown) at an endpoint 512 of the first AXI stream interconnect 401 is to stream data to an endpoint device at an endpoint 514 that is also of the first AXI stream interconnect 401, and assume the same addressing scheme as described above.

First, a routing header 50 may be generated and prepended 1001 to the data stream in a source endpoint device. Specifically, the endpoint device (not shown) at endpoint 512, to achieve this routing, constructs a routing header 50 as depicted in FIG. 3, with byte 12 (the source interconnect ID) set to 0x5A, byte 13 (the source port ID) set to 0x02, byte 14 (the destination interconnect ID) set to 0x5A, and byte 15 (the destination port ID) set to 0x04. The payload length (which determines the total packet length) may be set according to a predetermined length, or may be determined dynamically depending on transmission conditions, the nature of the data being transmitted, tolerance for lost packets, amount of data to be sent, and so forth. Methods and algorithms for optimizing packet length are known in the industry, and are not central to this embodiment, so will not be described in detail. Let us assume arbitrarily a payload length of 1024 beats. In this case, bytes 60 through 63 would be set to 0x00 0x00 0x04 0x00. The endpoint device (not shown) that is connected to endpoint 512 then may prepend the routing header 50 to an AXI stream packet (which is the data that is to be streamed), data which may have already been accumulated in a buffer, not shown, within the endpoint device (not shown) at endpoint 512 or within the endpoint 512 itself, or data that is to be generated in real time.

Following this, under AXI streaming control, the routing header may be shifted 1002 into a FIFO buffer. Specifically, the endpoint device (not shown) at endpoint 512 begins to stream the packet, beginning with the routing header 50, to a first-in/first-out buffer (the FIFO buffer 31), depicted in FIG. 2C, of the I/O port 312 of the first AXI stream interconnect 401, depicted in FIG. 1, and the FIFO buffer 31 accepts the streaming packet from the endpoint 512, under AXI streaming control, that is, following the well-known AXI streaming protocol. Details of AXI streaming are well known in the art, and detailed explanations thereof, such as flow control, application of external clock signals, and the like, will be omitted here. Note that the endpoint device (not shown) at endpoint 512 need not wait for data for the entire packet to be accumulated before commencing the stream, but rather may begin to stream immediately, concurrent with generation of the payload data.

Under AXI streaming control, the routing header may then be shifted 1003 into a register slice buffer. Specifically, the FIFO buffer 31 in the I/O port 312, having received the TDATA signal that is the first beat of the packet (that beat being the routing header 50), begins streaming the packet, and a single-beat buffer (the first register slice buffer 32 in the I/O port 312) receives the TDATA signal that is the first beat of the packet (that is, the routing header 50) with the next clock cycle, following the AXI streaming protocol, based on the FIFO buffer 31 asserting the TDATA signal and the TVALID signal to the first register slice buffer 32, and monitors the TREADY signal from the first register slice buffer 32. Note that the FIFO buffer 31 may be structured so as to deassert the TREADY signal to the corresponding connection 550 (which, in this case, may be the endpoint 512) if the buffer becomes full, thereby preventing overflow. Under the AXI streaming protocol, payload beats are sequentially loaded into the FIFO buffer 31 from the endpoint 512.

The routing header may be applied 1004 to a destination extracting unit. Specifically, the first register slice buffer 32, having accepted a beat from the FIFO buffer 31 and the signal TDATA therefrom, immediately asserts this TDATA onto a switch destination output port signal generating device (the destination extracting unit 33 of the I/O port 312). Note that at this point the TDATA signal from the first register slice buffer 32 is the routing header 50.

Destination data from the routing header may be applied to a lookup table to generate and latch 1005 address information TDEST. Specifically, given that no address signal TDEST is yet latched and outputted from the destination extracting unit 33 and that the lookup table (not shown), has not been disabled, this TDATA is handled as a routing header 50, and, in accordance with the routing header 50 as defined in this embodiment and as depicted in FIG. 3, bytes 14 and 15 (the destination interconnect ID and the destination port ID) of this signal TDATA are applied to the lookup table that is depicted in FIG. 4A. Because these bytes contain the respective values of 0x5A and 0x04, the lookup table generates, as a switch destination output port signal (address signal TDEST), the result of 0100, and the address signal TDEST is latched to 0100 and outputted from the destination extracting unit 33 to the AXI streaming input port 461 of the AXI stream switch port 4502, of the AXI stream switch 450, that is connected to the I/O port 312. At this time, a control signal, not shown, is applied to disable the lookup table circuitry until the circuitry is resetted through the application of a TLAST signal. Note that because the lookup table is deployed in hardware as a gate array and is simple and of extremely small scope, as depicted in FIG. 4A and FIG. 4B, the delay through the lookup table is extremely short, as little as a single clock cycle. At the same time, TDATA from the first register slice buffer 32 also passes through the destination extracting unit 33 with a delay of a single clock cycle, to be applied to the AXI streaming input port 461 of the AXI stream switch port 4502.

Substantially simultaneously with the application 1004 of the routing header to the destination extracting unit, and the generation and latching 1005 of the TDEST signal, that is, within the same clock cycle after only propagation delay, TDEST is applied to an AXI switch to establish 1006 a route through the switch. Specifically, the address signal TDEST is applied to the AXI stream switch 450 (through the AXI streaming input port 461 of the AXI stream switch port 4502), where this signal is applied to a gate array, not shown, within the AXI stream switch 450, causing the AXI streaming input port 461 of a first input/output port (the AXI stream switch port 4502 in FIG. 2A) to be connected to the AXI streaming output port 462 of a second input/output port (the AXI stream switch port 4504 in FIG. 2A). Note that this connection causes all of the AXI stream signals, including TDATA, TVALID, TKEEP, and TLAST from the destination extracting unit 33 that are applied to the AXI streaming input port 461 of the AXI stream switch port 4502, and TREADY from the second register slice buffer 34 of I/O port 314 that is applied to the AXI streaming output port 462 of the AXI stream switch port 4504 to pass directly through the AXI stream switch 450, without buffering or a clock delay. The effect is that a persistent path is established between the output of the destination extracting unit 33 of I/O port 312 and the input of the second register slice buffer 34 of I/O port 314.

The routing header is shifted into a register slice buffer of the destination I/O port, and the first payload beat is shifted 1007 into a register slice buffer of source I/O port. Specifically, with the clock cycle following the establishment 1006 of the route through the switch, the TDATA that is inputted is shifted into and latched in a second single-beat buffer (the second register slice buffer 34 of I/O port 314, which is connected to the AXI stream switch port 4504), under AXI streaming control, from the destination extracting unit 33 of I/O port 312 through the AXI stream switch 450, making it available to the endpoint 514. With this same clock cycle, the first payload beat is applied to the input of the register slice buffer 34 from the output of the destination extracting unit 33 of I/O port 312 via this same path. While at this time TDATA from the first register slice buffer 32 of I/O port 312 is applied to the destination extracting unit 33 of I/O port 312, the address signal TDEST is already latched, and the lookup table (not shown) thereof is disabled, so bytes 14 and 15 of the TDATA signal from the first register slice buffer 32 are not applied to the lookup table (not shown), and the address signal TDEST is not changed.

The routing header is shifted into the destination endpoint and source information and payload length information are stored 1008 in an endpoint device that is connected thereto. Specifically, the TDATA signal is shifted into a destination end point (the endpoint 514) from the second register slice buffer 34 of I/O port 314 under AXI streaming control, that is, under a protocol wherein the endpoint 514 accepts the TDATA signal from the second register slice buffer 34 with each clock cycle insofar as TVALID is asserted from the second register slice buffer 34, and wherein the second register slice buffer 34 of I/O port 314 continues to provide data, with each clock cycle, to the endpoint 514 as long as the endpoint 514 asserts the TREADY signal to the second register slice buffer 34 of I/O port 314. As endpoint 514 receives the first beat of the packet, an endpoint device (not shown) that is connected to the endpoint 514 receives and handles the command type and message type from bytes 0 through 3 of TDATA (where TDATA at this point contains the routing header 50), stores the source interconnect ID and source port ID from bytes 12 and 13 of TDATA (which in this case have the values of 0x5A and 0x02), and stores the payload length from bytes 60 through 63 of TDATA (which in this case is 1024, as described above).

Under AXI streaming control, the payload data is streamed 1009 through the circuit that has been established. Specifically, now that the connection has been established between the endpoint 512 and the endpoint 514, the balance of the data in the AXI data packet (being payload data) is streamed between said endpoints. When, for example, an arbitrary beat N of the payload is received into the endpoint 514, beat N+1 is received into the second register slice buffer 34 of I/O port 314, beat N+d is received into the destination extracting unit 33 of I/O port 312, and beat N+d+1 is received into the first register slice buffer 32 of I/O port 312, where d indicates the number of clock cycles required for a signal to traverse the AXI stream switch. Note that the TKEEP signal and the TLAST signal, which at this point is not asserted, are also shifted through the destination extracting unit 33 of I/O port 312 and are buffered simultaneously with the corresponding data in the second register slice buffer 34 of I/O port 314.

The source endpoint device streams the last payload beat and asserts 1010 TLAST. Specifically, the endpoint 512 streams the last beat of the packet, beat 1024, by asserting the TDATA signal into the FIFO buffer 31 of I/O port 312. At this time the endpoint 512 asserts the TLAST signal. The TLAST signal is shifted, together with the TDATA signal, through the FIFO buffer 31 of I/O port 312, and then shifted into the first register slice buffer 32 of I/O port 312, under AXI streaming control.

TLAST is applied to the destination extracting unit to unlatch 1011 TDEST. Specifically, when the TLAST signal is applied from the first register slice buffer 32 of I/O port 312 to the destination extracting unit 33 of I/O port 312, this TLAST signal identifies, to the destination extracting unit 33 of I/O port 312, that the current beat is the last beat of the stream, and the TLAST signal is applied (with a timing delay that is designed to prevent corruption of the final TDATA signal) to unlatch the TDEST signal circuit, resetting the destination extracting unit 33 of I/O port 312, thereby preparing the destination extracting unit 33 of I/O port 312 to accept the next routing header 50 and to set the next address signal TDEST.

The last beat of the packet, together with TLAST, is shifted 1012 into the destination endpoint. Specifically, the TDATA of the last beat of the AXI stream is shifted, together with the TLAST signal, through the second register slice buffer 34 of I/O port 314 to the destination endpoint (endpoint 514). The endpoint device (not shown) that is connected to endpoint 514, having received the TLAST signal, may execute a procedure to compare 1013 the number of words received to the payload length value (the stream length field in the routing header) which was stored above in the endpoint device (not shown). If the number of words received is less than the payload length value, the endpoint device (not shown) that is connected to endpoint 514 may use the source interconnect ID and source port ID, which were stored in the endpoint device (not shown), to send 1014 a prescribed message back to endpoint 512 indicating that data was lost, doing so using a procedure that is analogous to that which was described above. Conversely, in another embodiment, if the number of words received is equal to this payload length value, the endpoint device (not shown) that is connected to endpoint 514 may use the source interconnect ID and source port ID, which were stored in the endpoint device (not shown), to send a prescribed message back to endpoint 512 indicating that data was received successfully, doing so using a procedure that is analogous to that which was described above. In yet another embodiment, the endpoint device (not shown) that is connected to endpoint 514 may accept loss of data without sending a return message.

Let us now assume another scenario where an endpoint device (not shown) at endpoint 512 of one FPGA 201 is to stream data to an endpoint device (not shown) at an endpoint 523 of another FPGA 202, where these two FPGAs 201 and 202 are connected together via an Aurora link, as depicted in FIG. 1, and assume the same addressing scheme as used above.

In the same manner as in the embodiments set forth above, first, a routing header is generated and prepended 2001 to the data stream in a source endpoint device. Specifically, the endpoint device (not show) at endpoint 512, to achieve this routing, constructs a routing header 50 with byte 12 (the source interconnect ID) set to 0x5A, byte 13 (the source port ID) set to 0x02, and byte 15 (the destination port ID) set to 0x04, but with byte 14 (the destination interconnect ID) set to 0x5B. Let us assume again a payload length of 1024 words, with bytes 60 through 63 set respectively to 0x00 0x00 0x04 0x00. As in the first example, above, the endpoint device (not shown) at endpoint 512 then prepends this routing header 50 to the data that is to be streamed.

Following this, under AXI streaming control, the routing header is shifted 2002 into a FIFO buffer. Specifically, the endpoint device (not shown) at endpoint 512 begins to stream the packet, beginning with the routing header 50, to the FIFO buffer 31 of I/O port 312, in the same manner as in the example described above.

Under AXI streaming control, the routing header is shifted 2003 into a register slice buffer. Specifically, the FIFO buffer 31 of I/O port 312, having received the first beat of the packet (that beat being the routing header 50), begins streaming the packet in the same manner as in the example described above.

The routing header is applied 2004 to a destination extracting unit. Specifically, the first register slice buffer 32 of I/O port 312, having accepted a beat from the FIFO buffer 31 of I/O port 312 in the signal TDATA therefrom, immediately asserts this TDATA onto the destination extracting unit 33 of I/O port 312, in the same manner as described above.

Destination data from the routing header is applied to a lookup table to generate and latch 2005 address information TDEST. Specifically, in the same manner as described in the embodiment set forth above, TDATA is handled as a routing header 50, and bytes 14 and 15 (the destination interconnect ID and the destination port ID) of this signal TDATA are applied to the lookup table that is depicted in FIG. 4A. However, because byte 14 contains the value of 0x5B, the value of byte 15 is ignored, and the lookup table yields the result of 0010, so the address signal TDEST is latched to 0010 and outputted from the destination extracting unit 33 of I/O port 312 to the AXI streaming input port 461 of the AXI stream switch port 4502. At this time, as described in the earlier example, a control signal, not shown, is applied to disable the lookup table circuitry in the destination extracting unit 33 of I/O port 312 until the circuitry is resetted through the application of a TLAST signal. At the same time, TDATA from the first register slice buffer 32 of I/O port 312 also passes through the destination extracting unit 33 of I/O port 312, with a one clock cycle delay, to be applied to the AXI streaming input port 461 of the AXI stream switch port 4502.

Substantially simultaneously with the application 2004 of the routing header to the destination extracting unit, and the generation and latching 2005 of the TDEST signal, that is, within the same clock cycle after only propagation delay TDEST is applied to an AXI switch to establish 2006 a route through the switch. Specifically, the address signal TDEST is applied to the AXI stream switch 450 through the AXI streaming input port 461 of the AXI stream switch port 4502, where this signal is applied to a gate array, not shown, within the AXI stream switch 450, causing the AXI streaming input port 461 of the AXI stream switch port 4502 to be connected to the AXI streaming output port 462 of the AXI stream switch port 4501, which is connected to the second register slice buffer 34 of I/O port 311. As in the example described above, this connection causes all of the AXI stream signals, including TDATA, TVALID, TKEEP, and TLAST from the destination extracting unit 33 of I/O port 312 that are applied to the AXI streaming input port 461 of the AXI stream switch port 4502, and TREADY from the second register slice buffer 34 of I/O port 311 that is applied to the AXI streaming output port 462 of the AXI stream switch port 4501, to pass directly through the AXI stream switch 450, without buffering or a clock delay. The effect is that a persistent path is established between the output of the destination extracting unit 33 of I/O port 312 and the input of the second register slice buffer 34 of I/O port 311.

Figure 7:
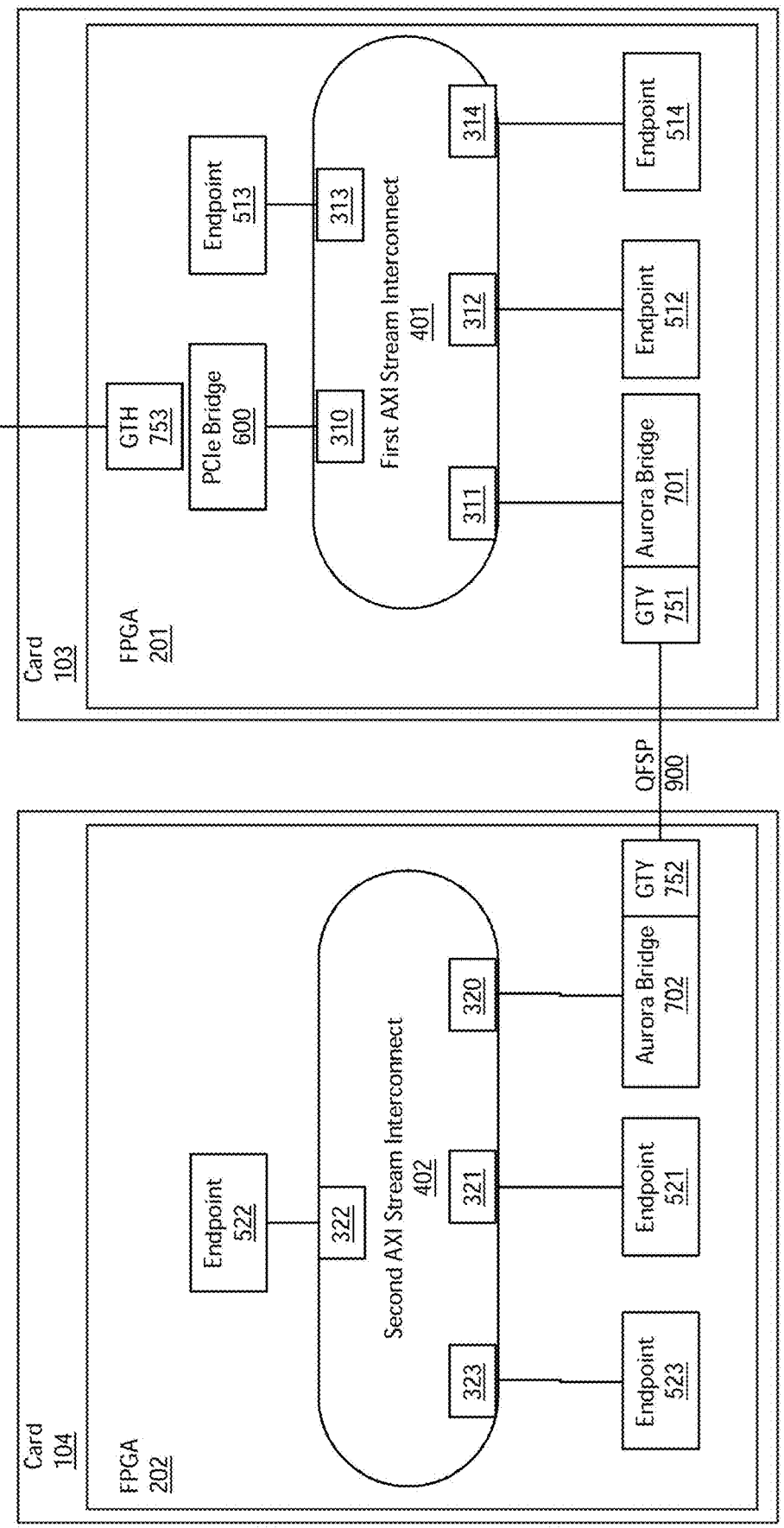
FIG. 7 is a block diagram illustrating an electronic communication system according to another embodiment, wherein an addressable AXI streaming protocol is used for communication with multiple endpoints on multiple AXI stream interconnects on multiple circuit boards (cards) to enable communication between multiple cards.

The routing header is shifted into a register slice buffer of the Aurora I/O port, and the first payload beat is shifted 2007 into a register slice buffer of source I/O port. Specifically, with the clock cycle following the establishment 2006 of the route through the switch, the second register slice buffer 34 of I/O port 311 latches the TDATA that is inputted, under AXI streaming control, from the destination extracting unit 33 of I/O port 312 through the path through the AXI stream switch 450, making it available to the Aurora converter 701 that is depicted in FIG. 7. With this same clock cycle, the first payload beat is applied to the input of the second register slice buffer 34 of I/I port 311 from the output of the destination extracting unit 33 of I/O port 312 via this same path. As in the earlier example, while at this time TDATA from the first register slice buffer 32 of I/O port 312 is applied to the destination extracting unit 33 of I/O port 312, the address signal TDEST is already latched, and the lookup table is disabled, so bytes 14 and 15 of the TDATA signal from the first register slice buffer 32 of I/O port 312 are not applied to the lookup table, and the address signal TDEST is not changed.

The routing header is shifted into the Aurora connector after conversion into the Aurora protocol, transmitted to the next Aurora connector, and converted back 2008 to the AXI protocol, specifically the TDATA signal (which is a beat of the AXI stream) from the second register slice buffer 34 of I/O port 311 is shifted into a first protocol converter (the Aurora converter 701) under AXI streaming control that is, under a protocol wherein the endpoint 514 accepts the TDATA signal from the second register slice buffer 34 of I/O port 311 with each clock cycle insofar as TVALID is asserted from the second register slice buffer 34 of I/O port 311, and the second register slice buffer 34 of I/O port 311 continues to provide data, with each clock cycle, to the Aurora converter 701 as long as the Aurora converter 701 asserts the TREADY signal to the second register slice buffer 34 of I/O port 311. As the Aurora converter 701 accepts the data in TDATA, the data are converted into beats of an Aurora stream for transmission through a first high-speed transceiver 751 through traces or, in other embodiments, through an appropriate medium such as a backplane or a QSFP, or the like, to be received by a second high-speed transceiver 752, and converted back into an AXI stream (AXI protocol signals) by a second protocol converter (the Aurora converter 702). This process of AXI-Aurora conversion by the Aurora converter 701, transmission between two high-speed transceivers 751 and 752, and conversion back into the AXI protocol through an Aurora converter 702 is well known in the art, so does not need to be described in detail here. It should be appreciated, however, that the conversion from the AXI protocol to the Aurora protocol is a process of serialization, where the number of physical connections between the high-speed transceivers 751 and 752 is small compared to the 512-bit-wide data path used in the AXI protocol in this embodiment, and that the narrower data path and serialized data is more conducive for communications over longer distances.

At this point, the communication from the Aurora converter 702, through shifting 2009 of the routing header under AXI streaming control through the FIFO buffer 31 of I/O port 320, shifting 2010 of the routing header under AXI streaming control into the first register slice buffer 32 of I/O port 320, and shifting 2011 of the routing header into the destination extracting unit 33 of I/O port 320, follows the same as described, above, so redundant explanations will be omitted.

In the same manner as described above, destination data from the routing header are applied to a lookup table to generate and latch 2012 TDEST. Specifically TDATA is handled as a routing header 50, and bytes 14 and 15 (the destination interconnect ID and the destination port ID) of this signal TDATA are applied to the lookup table that is depicted in FIG. 4B. This time, however, because byte 14 contains the value of 0x5B and the value of byte 15 is 0x03, the lookup table yields the result of 0011, so the address signal TDEST is latched to 0011 and outputted from the destination extracting unit 33 of I/O port 20 to the AXI streaming input port 461 of the AXI stream switch port 4510 of the AXI stream switch 451. At this time, as described above, a control signal, not shown, is applied to disable the lookup table circuitry of the destination extracting unit 33 of I/O port 20 until the circuitry is resetted through the application of a TLAST signal. At the same time, TDATA from the first register slice buffer 32 of I/O port 20 is also clocked through the destination extracting unit 33 of I/O port 20 to be applied to the AXI streaming input port 461 of the AXI stream switch port 4510.

The application 2013 of TDEST to the AXI stream switch 451 to establish a circuit through the AXI stream switch 451 and the destination extracting unit 33 of I/O port 20 between the first register slice buffer 32 of I/O port 20 and the second register slice buffer 34 of the port 323, the shifting 2014 of the routing header through AXI stream control into the second register slice buffer 34, and the shifting of the routing header into the destination endpoint and the storage 2015 of source information and payload length data in the endpoint 523, the streaming 2016 of the payload data under AXI streaming control, the streaming 2017 of the last payload beat with the TLAST signal, the unlatching of the address signals TDEST in the destination extracting unit 3123 and the destination extracting unit 33 of I/O port 20 through applying 2018 TLAST to both destination extracting units, the shifting 2019 of the final beat, along with the TLAST signal, into the endpoint 523, the comparison 2020 of the amount of data received against the value received for the payload length in the routing header 50 to determine whether or not all data have been received successfully, and the returning 2021 of a message to the source endpoint device are carried out in the same manner as was described in the earlier embodiment that was set forth above, so redundant explanations will be omitted here.

The embodiment described above enables extremely fast and reliable addressable communication between various components within an FPGA and between FPGAs. This enables addressable data transfers to be carried out between devices, where such addressability has not been possible in conventional AXI interconnects. This addressability opens a broad range of applications that require low-latency, high-bandwidth addressability such as has not been possible in the past.

Another embodiment is depicted in FIG. 7. Note that this embodiment is extremely similar to the one depicted in FIG. 1. The difference is that, whereas in the embodiment depicted in FIG. 1, FPGA 201 and FPGA 202 were both within the same card 101 so that addressable communications in the earlier embodiment were limited to being within the single card 101, in the embodiment depicted in FIG. 7, FPGA 203 is on a first circuit board (card 103) and FPGA 204 is on a second circuit board (card 104), and the communication that is carried out following the flowchart in FIG. 6 is addressable communication between cards. In the embodiment depicted in FIG. 7, the QSFP 900, connecting between the high-speed transceivers 752 and 751, may be an optical medium comprising multiple strands of optical interconnections, or may be an electrical conductor such as a backplane, an electrical QSFP connector, or the like. The use of an optical medium enables extremely rapid communication between physically separated boards, which, when combined with the addressability that results from the novel AXI stream interconnect, enables structuring of complex data communication systems with extremely low latencies due to the ability to switch an AXI interconnect at substantially the same speed with which a signal passes through a static AXI interconnect, combined with fast board-to-board data communications through the Aurora protocol.

Figure 8:
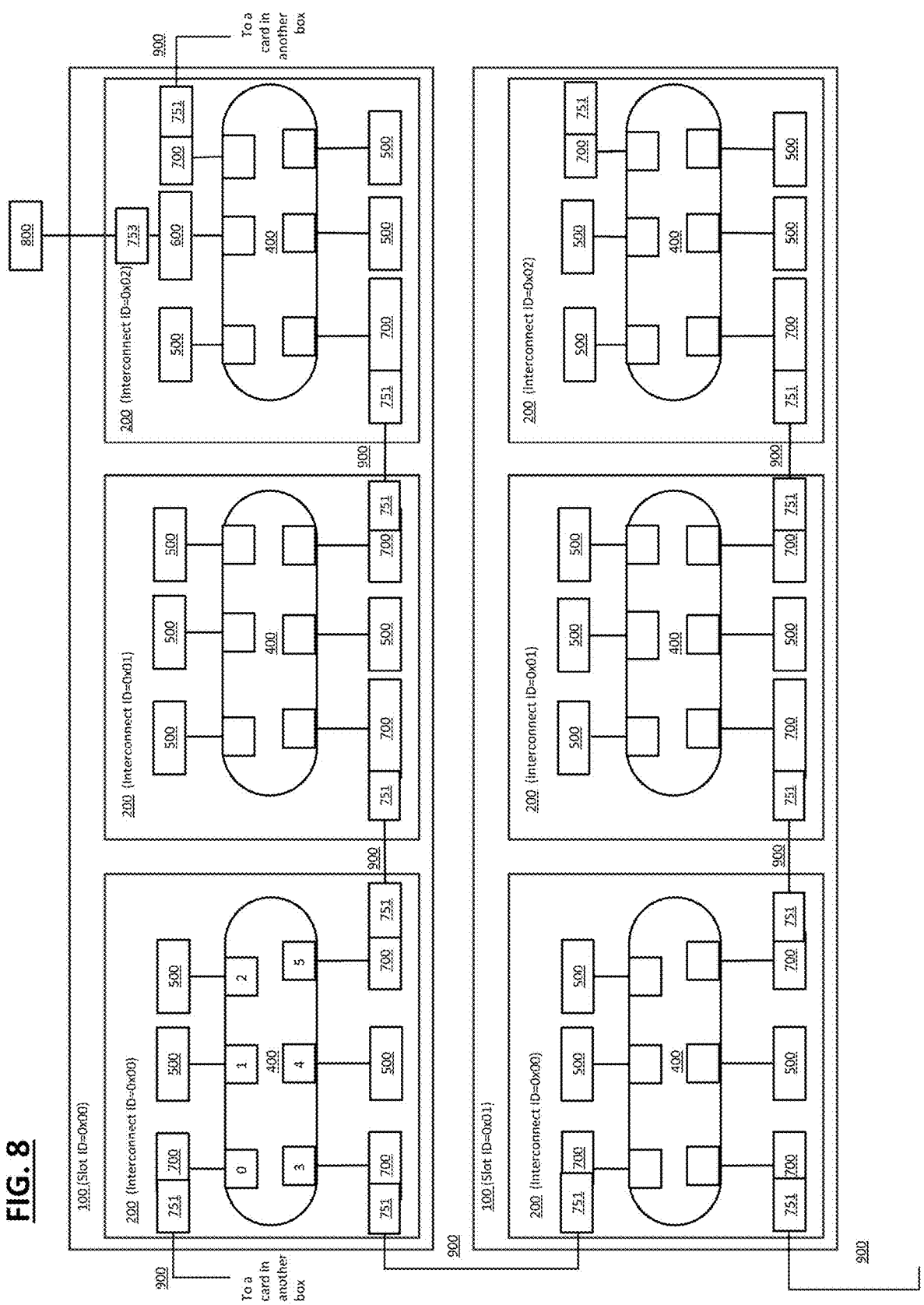
FIG. 8 is a block diagram illustrating yet another embodiment of an electronic communication system, wherein multiple boxes with multiple cards and multiple FPGAs are connected together in a complex addressable structure.

Yet another embodiment is depicted in FIG. 8. In this embodiment, a plurality of cards 100 is provided in a plurality of corresponding slots, not shown. Pluralities of cards 100, installed in the corresponding slots (not shown) are housed in boxes (not shown) Each card 100 includes a plurality of AXI stream interconnects 400, and each interconnect has a plurality of I/O ports (indicated by the boxes within each AXI stream interconnect 400), where these I/O ports are of the same structure as illustrated in FIG. 2C. These I/O ports are connected to endpoints 500, or to a PCIe converter 600 that is connected through a high-speed transceiver 753 and a backplane, not numbered, to a CPU 800, or to Aurora converters 700 that are connected to high-speed transceivers 751, all having the same structures as described in previous embodiments. The high-speed transceivers 751 are connected to appropriate transmission media 900 for carrying signals, either electrically or optically. These high-speed transceivers 751 are used to connect between FPGAs 200 within a card 100, between FPGAs 200 located on different cards 100 (as can be seen on the left in the diagram), or even between FPGAs 200 located in different boxes, not numbered (as can be seen at the upper left and the upper right of the diagram).

FIG. 9 defines a routing header that is suitable for use with the embodiment depicted in FIG. 8. The routing header in FIG. 9 is identical to that described above in reference to FIG. 3, except for the addition of more addressing information, specifically a two-byte source box ID, a two-byte source slot ID, a two-byte destination box ID, and a two-byte destination slot ID. That is, the routing header further includes a source slot ID field (Src Slot ID), a source box ID field (Src box ID), a destination slot ID field (Dst slot ID), and a destination box ID field (Dst box ID). This additional information enables addressing of any port in any AXI stream interconnect in any slot in any box within the system.

As can be observed in FIG. 8, multiple AXI stream interconnects are daisy chained together or connected in tree structures. Properly designed lookup tables enable addressing of all of the ports in the system. FIG. 10 provides an example of a lookup table that can be used with the embodiment depicted in FIG. 8. This lookup table will be explained below. Let us assume that the cards 100 depicted in FIG. 8 have slot IDs that are numbered sequentially 0x00, 0x01, 0x02 from top to bottom in FIG. 8, that the AXI stream interconnects 400 depicted in FIG. 8 have IDs that are numbered sequentially 0x00, 0x01, 0x02 from left to right, as indicated in FIG. 8, and that the ports are numbered as indicated by the single-digit numerals shown in the AXI stream interconnects 400 in FPGA 200 at the upper-left in FIG. 8. Let us further assume, arbitrarily, that the cards depicted in FIG. 8 are installed in a box with a box ID of 0x05.

In this case, the lookup table depicted in FIG. 10, when applied to any of the ports within this particular stream interconnect 400, will produce address signals TDEST that will cause the AXI stream switch, not illustrated, within each AXI stream interconnect 400 to connect the signals appropriately to forward them toward the correct destination. This is achieved through routing, to I/O port #0 within any given AXI stream interconnect 400, any stream that is to arrive at a box with a higher box ID number than that of the given AXI stream interconnect 400; routing, to I/O port #5 within any given AXI stream interconnect 400, any stream that is to arrive at a box with a lower box ID number than that of the given AXI stream interconnect 400 and any stream that is to arrive at a stream interconnect 400, within the same card 100, that has a higher interconnect ID number than that of the given AXI stream interconnect 400; routing, to I/O port #3 within any given AXI stream interconnect 400, any stream that is to arrive at a card 100, within the same box, that has a higher card number than that of the given AXI stream interconnect 400; and routing, to the applicable endpoints 500 within any given AXI stream interconnect 400, any stream that has already arrived at the correct interconnect 400 in the correct card 100 of the correct box. The hierarchical addressing scheme depicted in FIG. 9 enables streaming to any I/O port from any I/O port, within the entire network, using streaming through the AXI protocol and the Aurora protocol that is carried out as depicted in FIG. 6. This hierarchical addressing scheme, through the hardware configuration depicted in FIG. 8, allows for expansion of the communication system to an arbitrary number of boxes that include an arbitrary number of cards 100 (disposed in respective slots), each having an arbitrary number of FPGAs 200 that include AXI stream interconnects 400, and also allows the CPU 800 to communicate broadly, low latency and high speeds, through this communication system endpoint devices located at endpoints on any AXI stream interconnect 400 of any FPGA 200 of any card 100 of any box (unnumbered) in the electronic communication system.

Note that there is no limitation to the structure of connections depicted in FIG. 8, but rather various other connection schemes may be considered in other embodiments. For example, in other embodiments multiple FPGAs within a card may be connected to FPGAs in other cards through Aurora converters 700, high-speed transceivers 751, and a transmission medium 900. While this would have the drawback of requiring more physical connections, it could provide a benefit in reducing latency by enabling more direct routing of streams, and less opportunity for collisions of streams.

The foregoing descriptions of the embodiments of the present disclosure has been presented for the purposes of illustration and description. They are not intended to be exhaustive nor to limit the present disclosure to the precise forms disclosed. Many modifications and variations are possible in light of this disclosure, and combinations of the elements disclosed in the individual embodiments may be recombined and substituted with each other within the scope disclosed by the claims. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

DESCRIPTIONS OF REFERENCE SYMBOLS

50: Routing Header
100, 101, 103, 104: Cards (Electronic Circuit Boards)
200, 201, 202, 203, 204: FPGAs (Field-Programmable Gate Arrays)
30, 310, 311, 312, 313, 314, 320, 321, 322, 323: Input/Output Ports
31: FIFO Buffer
32, 34: Register Slice Buffers (Single-Beat Buffers)
33: Destination Extracting Unit (Switch Destination Output Port Signal Generating Device)
400, 401, 402: AXI Stream Interconnects (Addressably Switchable Interconnecting Devices)
45, 450, 451: AXI Stream Switches
4500, 4501, 4501, 4504, 4510, 4513, 46: AXI Stream Switch Ports
461: AXI Streaming Input Port
462: AXI Streaming Output Port
500, 512, 513, 514, 521, 522, 523: Endpoints
550: Connection
600: AXI-PCIe Converter (PCIe Bridge)
700, 701, 702: AXI-Aurora Converter (Aurora Bridge, Protocol Converter)
751, 752: High-speed transceivers (Ultrascale Gigabit Transceivers) (GTY)
753: High-performance Gigabit Transceiver (GTH)
800: CPU
900: Transmission Medium (QFSP (Quad Small Form-Factor Pluggable) Cable, Transceiver-Transceiver Interconnection)

What is claimed is:

1. An electronic communication system, comprising:
an addressably switchable interconnecting device, comprising a stream switch having a plurality of input/output ports;
a switch destination output port signal generator configured to generate and output a switch destination output signal;

a first input/output port, of said plurality of input/output ports, configured so as to receive a data signal, a control signal, and the switch destination output port signal; and
a second input/output port, of said plurality of input/output ports, connected to said first input/output port by a connection that is formed in accordance with the switch destination output port signal;
wherein the addressably switchable interconnecting device further comprises:
a data first-in/first-out buffer for receiving, buffering, and outputting the data signal and the control signal to the first input/output port; and
wherein the addressably switchable interconnecting device further comprises:
a first single-beat buffer for receiving the data signal and the control signal from the data first-in/first-out buffer, buffering the data signal and the control signal, and outputting the data signal and the control signal to the first input/output port and to the switch destination output port signal generating device.

2. The electronic communication system set forth in claim 1, wherein the addressably switchable interconnecting device further comprises:
a second single-beat buffer for receiving the data signal and a control signal from the second input/output port, for buffering the data signal, and for outputting the data signal and the control signal.

3. The electronic communication system set forth in claim 1, wherein:
the addressably switchable interconnecting device is configured so as to operate using an Advanced Extensible Interface ("AXI") streaming protocol, and wherein a control signal is an AXI streaming protocol control signal.

4. The electronic communication system set forth in claim 1, wherein:
the switch destination output port signal generating device comprises a lookup table.

5. The electronic communication system set forth in claim 4, wherein:
the switch destination output port signal generating device is configured so as to receive a routing header beat in the data signal and to apply the routing header beat to the lookup table to generate the switch destination output port signal.

6. The electronic communication system set forth in claim 5, wherein:
the switch destination output port signal generating device is configured so that, after a switch destination output port signal is generated, that switch destination output port signal is maintained throughout a subsequent data stream until the switch destination output port signal is cleared by a control signal.

7. The electronic communication system set forth in claim 6, comprising:
a plurality of said addressably switchable interconnecting devices;
a first protocol converting device, connected through an interconnection to a port of a first addressably switchable interconnecting device, of said plurality of addressably switchable interconnecting devices, for converting between the Advanced Extensible Interface ("AXI") streaming protocol and a second streaming protocol;
a second protocol converting device, connected through an interconnection to a port of a second addressably switchable interconnecting device, of said plurality of addressably switchable interconnecting devices, for converting between the AXI streaming protocol and the second streaming protocol;
a first high-speed transceiver that is connected through an interconnection to the first protocol converting device;
a second high-speed transceiver that is connected through an interconnection to the second protocol converting device; and
a transceiver-transceiver interconnection connected between the first high-speed transceiver and the second high-speed transceiver.

8. The electronic communication system, set forth in claim 7, wherein:
the first addressably switchable interconnecting device, the first protocol converting device, the first high-speed transceiver, the second addressably switchable interconnecting device, the second protocol converting device, and the second high-speed transceiver are all arranged on a single circuit board.

9. The electronic communication system, set forth in claim 7, wherein:
the first addressably switchable interconnecting device, the first protocol converting device, and the first high-speed transceiver are all arranged on a first circuit board, and the second addressably switchable interconnecting device, the second protocol converting device, and the second high-speed transceiver are all arranged on a second circuit board.

10. The electronic communication system set forth in claim 9, wherein:
the first circuit board and the second circuit board are disposed in separate slots.

11. The electronic communication system set forth in claim 9, wherein:
the first circuit board and the second circuit board are disposed in separate boxes.

12. The electronic communication system set forth in claim 7, wherein:
the second streaming protocol is an AMD Aurora protocol.

13. The electronic communication system set forth in claim 7, wherein:
the transceiver-transceiver interconnection is a backplane, an optical connector, or a high-speed printed circuit board trace.

14. An electronic communication method including the steps of:
generating a routing header and prepending it to data in a stream in a source endpoint device that is connected to an endpoint of a field programmable grid array;
shifting the routing header through a first-in/first-out buffer under Advanced Extensible Interface ("AXI") streaming control;
shifting the routing header through a single-beat buffer under AXI streaming control;
applying the routing header to a switch destination output port signal generating device to generate and latch a switch destination output port signal;
applying the switch destination output port signal to an AXI stream switch to establish a connection between a first input/output port of that switch and a second input/output port of that switch;
shifting the first beat of the AXI streaming packet into a second single-beat buffer, connected to the second input/output port, under AXI streaming control;

shifting the first beat of the AXI streaming packet into a destination end point;

streaming payload data through a circuit that has been established, under AXI streaming control;

identifying the last beat in the stream;

unlatching the switch destination output port signal;

shifting the last beat of the AXI stream to a destination endpoint;

comparing a number of words of data received to a stream length field in the routing header to evaluate whether or not the entire AXI stream has been received; and sending back, to the source end point, a message indicating that there has been a communication failure when the entire AXI stream has not been received.

15. The electronic communication method set forth in claim 14, further including the steps of:

comparing a number of words of data received to a stream length field in the routing header to evaluate whether or not the entire AXI stream has been received; and if the entire AXI stream has been received, using the same steps as in claim 14 to send back, to the source end point, a message indicating that the communication has been successful.

16. The electronic communication method set forth in claim 14, further including the steps of:

shifting a beat of the AXI stream from a second single-beat buffer into a first protocol converter to convert to a beat of a stream of a second streaming protocol;

transmitting a beat of the stream of the second streaming protocol from a first high-speed transceiver through an interconnection to a second high-speed transceiver;

converting a beat of the stream of the second streaming protocol into an AXI stream in a second protocol converter; and shifting a beat from the second protocol converter into a first-in/first-out buffer.

17. The electronic communication method set forth in claim 16, wherein:

the second streaming protocol is an AMD Aurora protocol.

* * * * *